(12) United States Patent
Jang et al.

(10) Patent No.: US 12,542,596 B2
(45) Date of Patent: Feb. 3, 2026

(54) METHOD AND APPARATUS FOR BEAM FAILURE RECOVERY IN NETWORK COOPERATIVE COMMUNICATION

(71) Applicant: Samsung Electronics Co., Ltd., Suwon-si (KR)

(72) Inventors: Youngrok Jang, Suwon-si (KR); Hoondong Noh, Suwon-si (KR); Jinhyun Park, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 471 days.

(21) Appl. No.: 17/779,818

(22) PCT Filed: Nov. 24, 2020

(86) PCT No.: PCT/KR2020/016723
§ 371 (c)(1),
(2) Date: May 25, 2022

(87) PCT Pub. No.: WO2021/107575
PCT Pub. Date: Jun. 3, 2021

(65) Prior Publication Data
US 2023/0006727 A1 Jan. 5, 2023

Related U.S. Application Data

(60) Provisional application No. 62/939,866, filed on Nov. 25, 2019.

(30) Foreign Application Priority Data

Jan. 9, 2020 (KR) ........................ 10-2020-0003123
May 28, 2020 (KR) ........................ 10-2020-0064358

(51) Int. Cl.
*H04B 7/024* (2017.01)
*H04B 7/06* (2006.01)
(Continued)

(52) U.S. Cl.
CPC ....... *H04B 7/06964* (2023.05); *H04L 5/0051* (2013.01); *H04W 24/04* (2013.01); *H04B 7/024* (2013.01)

(58) Field of Classification Search
CPC .... H04W 16/28; H04B 7/06964; H04B 7/088
See application file for complete search history.

(56) References Cited

U.S. PATENT DOCUMENTS 10,779,171 B2    9/2020  Yu et al.
2019/0058517 A1* 2/2019  Kang .................... H04L 5/0094
(Continued)

FOREIGN PATENT DOCUMENTS

CN          110351112 A      10/2019
CN          110447254 A      11/2019
KR    10-2021-0055555 A       5/2021

OTHER PUBLICATIONS

Chinese Notice of Allowance dated Apr. 19, 2024, issued in Chinese Patent Application No. 202080081923.8.
(Continued)

*Primary Examiner* — Yee F Lam
(74) *Attorney, Agent, or Firm* — Jefferson IP Law, LLP

(57) ABSTRACT

The present disclosure relates to a communication scheme and a system for combining an IoT technology with a 5G communication system for supporting a higher data transfer rate than a 4G system. The present disclosure may be applied to intelligent services (e.g., smart homes, smart buildings, smart cities, smart cars or connected cars, health care, digital education, retail business, and security- and safety-related services) on the basis of a 5G communication technology
(Continued)

and an IoT-related technology. The present disclosure proposes a method and an apparatus for beam failure recovery. An embodiment of the present disclosure provides a method of a terminal in a wireless communication system. The method of the terminal comprises the steps of: obtaining information on at least one reference signal for beam failure detection; identifying whether a beam failure is detected for each of a first reference signal set and a second reference signal set included in the at least one reference signal; and if a beam failure is detected for at least one of the first reference signal set and the second reference signal set, performing a beam failure recovery procedure for the reference signal set in which the beam failure is detected, wherein the first reference signal set is related to a first control resource set (CORESET) pool, and the second reference signal set is related to a second CORESET pool.

25 Claims, 16 Drawing Sheets

(51) Int. Cl.
*H04L 5/00* (2006.01)
*H04W 24/04* (2009.01)

(56) References Cited

U.S. PATENT DOCUMENTS

| | | | | |
|---|---|---|---|---|
| 2019/0173740 A1* | 6/2019 | Zhang | ............... | H04L 41/0677 |
| 2019/0207667 A1 | 7/2019 | Zhou et al. | | |
| 2019/0215048 A1 | 7/2019 | Cirik et al. | | |
| 2019/0268790 A1* | 8/2019 | Kwon | ............... | H04W 24/08 |
| 2019/0327769 A1 | 10/2019 | Yang et al. | | |
| 2019/0349061 A1 | 11/2019 | Cirik et al. | | |
| 2019/0357292 A1* | 11/2019 | Cirik | ............... | H04L 5/0053 |
| 2020/0177266 A1* | 6/2020 | Kang | ............... | H04L 5/0055 |
| 2020/0350972 A1* | 11/2020 | Yi | ............... | H04L 5/0051 |
| 2021/0105750 A1* | 4/2021 | Khoshnevisan | ...... | H04L 5/0053 |
| 2021/0105759 A1* | 4/2021 | Bai | ............... | H04L 5/0053 |
| 2021/0136802 A1* | 5/2021 | Cirik | ............... | H04L 5/0092 |
| 2021/0409091 A1* | 12/2021 | Svedman | ............... | H04W 72/23 |

OTHER PUBLICATIONS

Samsung, "Discussion on aperiodic indications from beam failure recovery related with RLF", R2-1806054, 3GPP TSG-RAN2#101bis, Apr. 6, 2018, Sanya, China.
LG Electronics, Enhancements on multi-TRP/panel transmission, R1-1912269, 3GPP TSG RAN WG1 Meeting #99, Reno, USA, Nov. 9, 2019.
Oppo, Discussion on Multi-beam Operation Enhancements, R1-1911844, 3GPP TSG RAN WG1 Meeting #99, Reno, USA, Nov. 8, 2019.
Apple Inc., Remaining Issues on Multi-beam operation, R1-1912824, 3GPP TSG RAN WG1 Meeting #99, Reno, USA, Nov. 9, 2019.
Lenovo etc, Discussion of multi-beam operation, R1-1912317, 3GPP TSG RAN WG1 Meeting #99, Reno, USA, Nov. 8, 2019.
AT&T, On beam recovery for partial and full control channel failure, R1-1716690, 3GPP TSG RAN WG1 Meeting NR#3, Sep. 18, 2017, Nagoya, Japan.
European Search Report dated Nov. 25, 2022, issued in European Application No. 20892285.6.
European Office Action dated May 15, 2025, issued in European Patent Application No. 20892285.6.
Korean Office Action dated Jul. 18, 2025, issued in Korean Patent Application No. 10-2020-0064358.

\* cited by examiner

METHOD AND APPARATUS FOR BEAM FAILURE RECOVERY IN NETWORK COOPERATIVE COMMUNICATION

TECHNICAL FIELD

The disclosure relates to a communication system and, more particularly, to a method and apparatus for configuring beam failure recovery (BFR) operation.

BACKGROUND ART

To meet the ever increasing demand for wireless data traffic since the commercialization of 4G communication systems, efforts have been made to develop improved 5G or pre-5G communication systems. As such, 5G or pre-5G communication systems are also called "beyond 4G network system" or "post LTE system". The 5G communication system defined by 3GPP is called the New Radio (NR) system.

To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas have been considered for 5G communication systems and have been applied to NR systems.

Additionally, to improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (COMP), interference cancellation, and the like.

Besides, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

On the other hand, with recent advances in communication systems, various studies have been made to improve the beam failure recovery procedure.

DISCLOSURE OF INVENTION

Technical Problem

Various embodiments of the disclosure are to provide a method and apparatus that can flexibly and efficiently perform beam failure recovery (BFR) operation in a wireless communication system, particularly, in a network cooperative communication situation.

Solution to Problem

According to an embodiment of the disclosure for solving the above problem, a method of a terminal in a wireless communication system is provided. The method of the terminal includes: obtaining information on at least one reference signal for beam failure detection; identifying whether a beam failure is detected for each of a first reference signal set and a second reference signal set included in the at least one reference signal; and in case that a beam failure is detected for at least one of the first reference signal set or the second reference signal set, performing a beam failure recovery procedure for the reference signal set in which the beam failure is detected, wherein the first reference signal set is associated with a first control resource set (CORESET) pool, and the second reference signal set is associated with a second CORESET pool.

In addition, according to an embodiment of the disclosure, a method of a base station in a wireless communication system is provided. The method of the base station includes: transmitting information on at least one reference signal for beam failure detection to a terminal; and in case that a beam failure is detected for at least one of a first reference signal set or a second reference signal set included in the at least one reference signal, receiving a signal related to a beam failure recovery request from the terminal, wherein the first reference signal set is associated with a first control resource set (CORESET) pool, and the second reference signal set is associated with a second CORESET pool.

In addition, according to an embodiment of the disclosure, a terminal in a wireless communication system is provided. The terminal includes: a transceiver; and a controller configured to: obtain information on at least one reference signal for beam failure detection; identify whether a beam failure is detected for each of a first reference signal set and a second reference signal set included in the at least one reference signal; and in case that a beam failure is detected for at least one of the first reference signal set or the second reference signal set, perform a beam failure recovery procedure for the reference signal set in which the beam failure is detected, wherein the first reference signal set is associated with a first control resource set (CORESET) pool, and the second reference signal set is associated with a second CORESET pool.

In addition, according to an embodiment of the disclosure, a base station in a wireless communication system is provided. The base station includes: a transceiver; and a controller configured to: transmit information on at least one reference signal for beam failure detection to a terminal; and in case that a beam failure is detected for at least one of a first reference signal set or a second reference signal set included in the at least one reference signal, control the transceiver to receive a signal related to a beam failure recovery request from the terminal, wherein the first reference signal set is associated with a first control resource set (CORESET) pool, and the second reference signal set is associated with a second CORESET pool.

Advantageous Effects of Invention

According to the disclosure, there is proposed a configuration method that allows the beam failure recovery (BFR) operation to be efficiently performed in a wireless communication system, so that it is possible to improve the transmission efficiency of a transmission reception point (TRP) and the reception performance of a terminal in a network cooperative communication situation.

MODE FOR THE INVENTION

Figure 1:
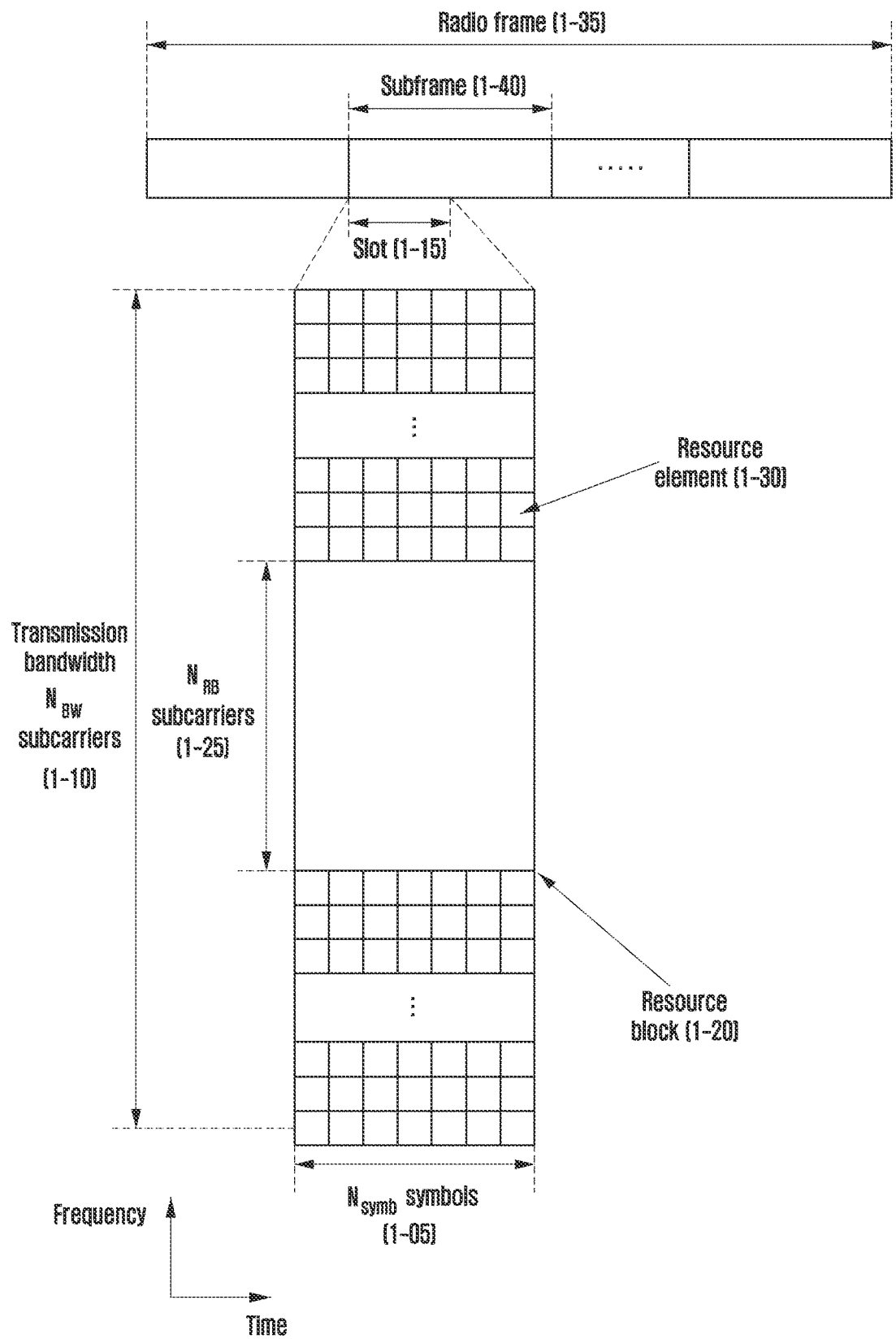
FIG. 1 is a diagram illustrating a time-frequency domain structure for transmission in long term evolution (LTE), LTE-advanced (LTE-A), new radio (NR) (5G), or similar wireless communication system according to the disclosure.

Hereinafter, embodiments of the disclosure will be described in detail with reference to the accompanying drawings.

In the following description of embodiments of the disclosure, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card. In addition, according to a certain embodiment, a unit or the like may include one or more processors.

Next, an operating principle of the disclosure will be described in detail with reference to the accompanying drawings. In the description of the disclosure, descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

In the following description, the term "base station (BS)" refers to a main agent allocating resources to terminals and may be at least one of gNode B, eNode B, Node B, radio access unit, base station controller, network node, or transmission and reception point (TRP). The term "terminal" may refer to at least one of user equipment (UE), mobile station (MS), cellular phone, smartphone, computer, or multimedia system with a communication function. However, it is not limited to the above example.

Hereinafter, the disclosure describes a technique for a terminal to receive broadcast information from a base station in a wireless communication system. The disclosure relates to a communication technique that combines 5G communication systems with IoT technology to support a higher data rate after 4G systems, and a system thereof. Based on 5G communication technology and IoT-related technology, the disclosure may be applied to intelligent services (e.g., services related to smart home, smart building, smart city, smart or connected car, health care, digital education, retail business, security, and safety).

Those terms used in the following description for indicating broadcast information, indicating control information, being related to communication coverage, indicating a state transition (e.g., event), indicating a network entity, indicating a message, indicating a component of a device, or the like are taken as illustration for ease of description. Accordingly, the disclosure is not limited by the terms to be described later, and other terms having an equivalent technical meaning may be used.

For convenience of description below, some terms and names defined in 3rd generation partnership project (3GPP) long term evolution (LTE) or 3GPP new radio (NR) standards may be used. However, the disclosure is not limited by the above terms and names, and may be equally applied to systems conforming to other standards.

Wireless communication systems are evolving from early systems that provided voice-oriented services only to broadband wireless communication system that provide high-speed and high-quality packet data services, such as systems based on communication standards including 3GPP high speed packet access (HSPA), long term evolution (LTE) or evolved universal terrestrial radio access (E-UTRA), LTE-advanced (LTE-A), LTE-Pro, 3GPP2 high rate packet data (HRPD), ultra-mobile broadband (UMB), and IEEE 802.16e.

As a representative example of the broadband wireless communication system, the LTE system employs orthogonal frequency division multiplexing (OFDM) in the downlink (DL) and single carrier frequency division multiple access (SC-FDMA) in the uplink (UL). The uplink refers to a radio link through which a terminal (user equipment (UE) or mobile station (MS)) sends a data or control signal to a base station (BS or eNode B), and the downlink refers to a radio link through which a base station sends a data or control signal to a terminal. In such a multiple access scheme, time-frequency resources used to carry user data or control information are allocated so as not to overlap each other (i.e., maintain orthogonality) to thereby identify the data or control information of a specific user.

As a post-LTE communication system, namely, the 5G communication system must be able to freely reflect various requirements of users and service providers and need to support services satisfying various requirements. Services considered for the 5G communication system include enhanced mobile broadband (eMBB), massive machine type communication (mMTC), and ultra-reliable and low-latency communication (URLLC).

According to some embodiments, eMBB aims to provide a data transmission rate that is more improved in comparison to the data transmission rate supported by existing LTE, LTE-A, or LTE-Pro. For example, in the 5G communication system, eMBB must be able to provide a peak data rate of 20 Gbps in the downlink and a peak data rate of 10 Gbps in the uplink from the viewpoint of one base station. At the same time, it has to provide an increased user perceived data rate for the terminal. To meet such a requirement, it is required to improve the transmission and reception technology including more advanced multi-input multi-output (MIMO) transmission. In addition, it is possible to satisfy the data transmission rate required by the 5G communication system by using a frequency bandwidth wider than 20 MHz in a frequency band of 3 to 6 GHz or 6 GHz or higher instead of the 2 GHz band currently used by LTE.

At the same time, in the 5G communication system, mMTC is considered to support application services such as the Internet of Things (IoT). For efficient support of IoT services, mMTC is required to support access of a massive number of terminals in a cell, extend the coverage for the terminal, lengthen the battery time for the terminal, and reduce the cost of the terminal. The Internet of Things must be able to support a massive number of terminals (e.g., 1,000,000 terminals/km$^2$) in a cell to provide a communication service to sensors and components attached to various devices. In addition, since a terminal supporting mMTC is highly likely to be located in a shadow area not covered by a cell, such as the basement of a building, due to the nature of the service, it may require wider coverage compared to other services provided by the 5G communication system. A terminal supporting mMTC should be configured as a low-cost terminal, and since it is difficult to frequently replace the battery of a terminal, a very long battery life time may be required.

Finally, URLLC, as cellular-based mission-critical wireless communication for a specific purpose, is a service usable for remote control of robots or machinery, industrial automation, unmanned aerial vehicles, remote health care, and emergency alert, and should provide ultra-reliable and low-latency communication. For example, a URLLC service may have to support both an air interface latency of less than 0.5 ms and a packet error rate of 10-5 or less as a requirement. Hence, for a service supporting URLLC, the 5G system must provide a transmission time interval (TTI) shorter than that of other services, and at the same time, a design requirement for allocating a wide resource in a frequency band is required. However, mMTC, URLLC, and eMBB described above are only an example of different service types, and the service types to which the disclosure is applied are not limited to the above-described examples.

The services considered in the above-mentioned 5G communication system should be provided in a form of convergence with each other based on a single framework. That is, for efficient resource management and control, it is preferable that individual services are integrated, controlled, and transmitted as a single system rather than being independently operated.

Further, embodiments of the disclosure will be described by using LTE, LTE-A, LTE Pro or NR systems as an example, but the embodiments of the disclosure may be applied to other communication systems having similar technical backgrounds or channel configurations. Also, it should be understood by those skilled in the art that the embodiments of the disclosure can be applied to other communication systems without significant modifications departing from the scope of the disclosure. Next, frame structures of LTE, LTE-A, and 5G systems are described with reference to the drawings, and the design direction of the 5G system will be described.

FIG. 1 is a diagram illustrating a time-frequency domain structure for transmission in a LTE, LTE-A, NR (5G), or similar wireless communication system according to the disclosure.

FIG. 1 shows the basic structure of a time-frequency resource region, which is a radio resource region in which data or control channels of a LTE, LTE-A, or NR system, based on a cyclic prefix (CP) orthogonal frequency division multiplexing (OFDM) (CP-OFDM) or single carrier-frequency division multiple access (SC-FDMA) waveform, are transmitted.

In FIG. 1, the horizontal axis indicates the time domain, and the vertical axis indicates the frequency domain. Uplink (UL) may mean a radio link through which a terminal transmits data or a control signal to a base station, and downlink (DL) may refer to a radio link through which a base station transmits data or a control signal to a terminal.

In the time domain of LTE, LTE-A, and NR systems, the minimum transmission unit is an OFDM symbol or SC-FDMA symbol, and $N_{symb}$ symbols 1-05 may be gathered to constitute one slot 1-15. In the case of LTE and LTE-A, two slots consisting of $N_{symb}=7$ symbols may be gathered to constitute one subframe 1-40. Also, according to some embodiments, in the case of 5G, two types of slot structures, a slot and a mini-slot (or non-slot) may be supported. $N_{symb}$ may have a value of 14 in the case of a 5G slot, and $N_{symb}$ may be set to one of 1, 2, 3, 4, 5, 6 and 7 in the case of a 5G mini-slot. In LTE and LTE-A, the length of a slot is fixed to 0.5 ms, and the length of a subframe is fixed to 1.0 ms; in the case of the NR system, the length of the slot or mini-slot may be flexibly changed according to the subcarrier spacing. In LTE and LTE-A, a radio frame 1-35 is a time domain unit consisting of 10 subframes. In LTE and LTE-A, the minimum transmission unit of the frequency domain is subcarriers in units of 15 kHz (subcarrier spacing=15 kHz), and the bandwidth of the total system transmission band is composed of a total of New subcarriers 1-10. The flexible extended frame structure of the NR system will be described later.

In the time-frequency domain, the basic resource unit is a resource element (RE) 1-30, which may be represented by an OFDM or SC-FDMA symbol index and a subcarrier index. A resource block (RB) 1-20 (or, physical resource block (PRB)) is defined by $N_{symb}$ successive OFDM or SC-FDMA symbols 1-05 in the time domain and $N_{RB}$ successive subcarriers 1-25 in the frequency domain. Hence, one RB 1-20 is composed of $N_{symb} \times N_{RB}$ REs 1-30. In LTE and LTE-A systems, data is mapped in units of RBs, and the base station performs scheduling in units of RB-pairs constituting one subframe for a specific terminal. The number of SC-FDMA or OFDM symbols, $N_{symb}$, is determined according to the length of a cyclic prefix (CP) inserted into each symbol for preventing inter-symbol interference; for example, $N_{symb}$ is set to 7 when a normal CP is applied, and $N_{symb}$ is set to 6 when an extended CP is applied. Compared with the normal CP, the extended CP can be applied to a system having a relatively large radio transmission distance to maintain orthogonality between symbols.

According to some embodiments, the subcarrier spacing, CP length, and the other are essential information for OFDM transmission and reception, and smooth transmission/reception may be possible only when the base station and the terminal recognize them mutually as common values.

The frame structure of LTE and LTE-A systems described above are designed in consideration of typical voice/data communication, and are limited in scalability for satisfying various services and requirements like the NR system. Therefore, in the NR system, it is necessary to define and operate the frame structure flexibly in consideration of various services and requirements.

Figure 2:
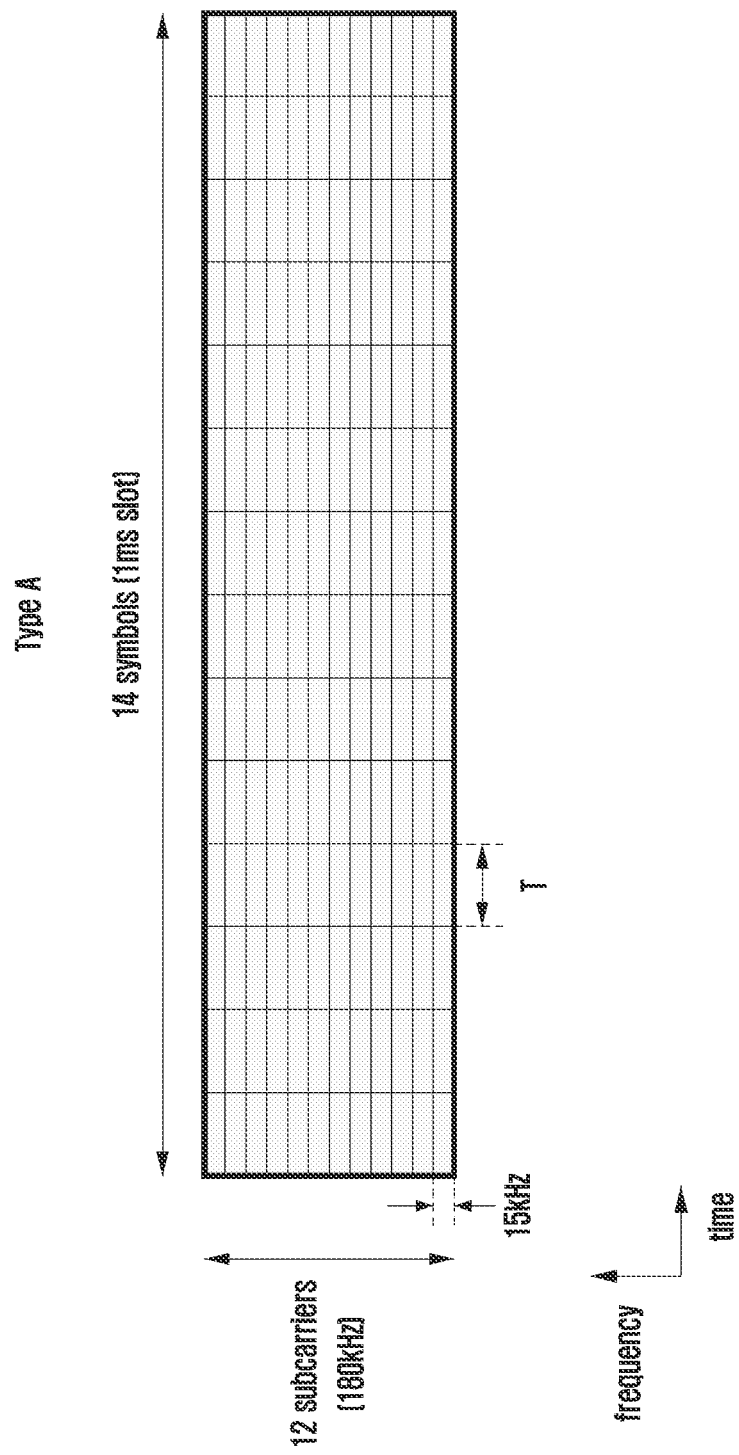
FIG. 2 illustrates an extended frame structure according to an embodiment of the disclosure.
Figure 3:
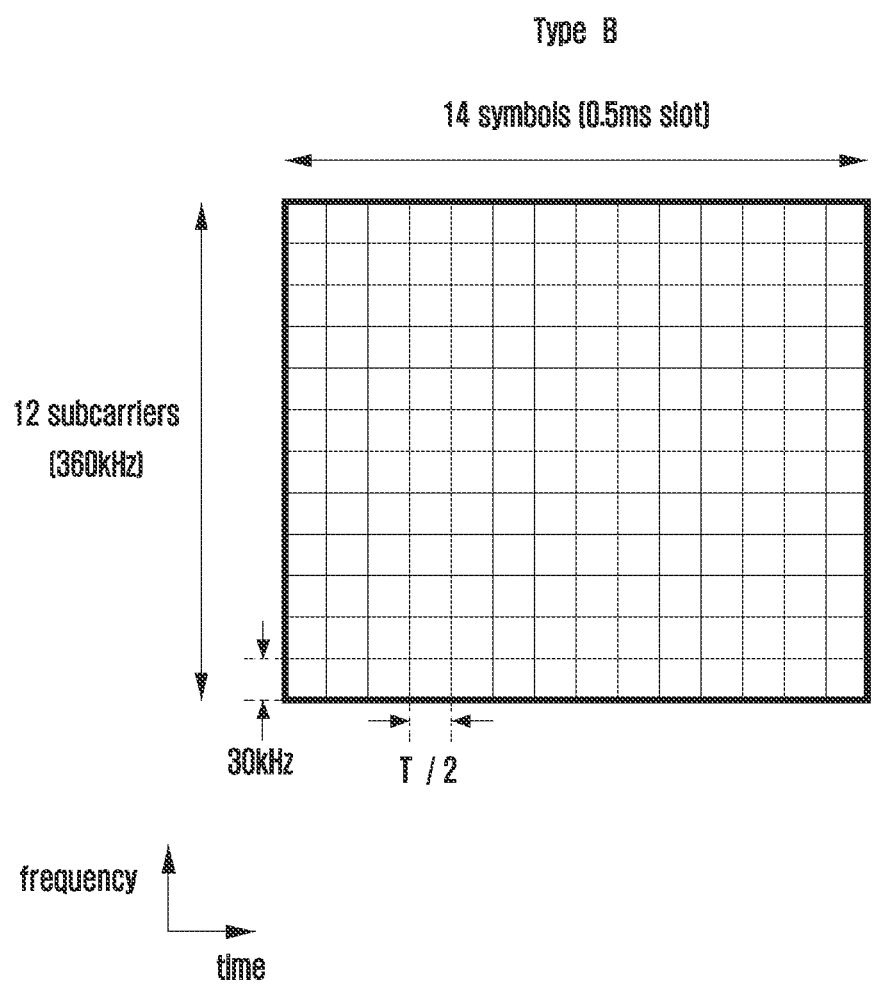
FIG. 3 illustrates an extended frame structure according to an embodiment of the disclosure.
Figure 4:
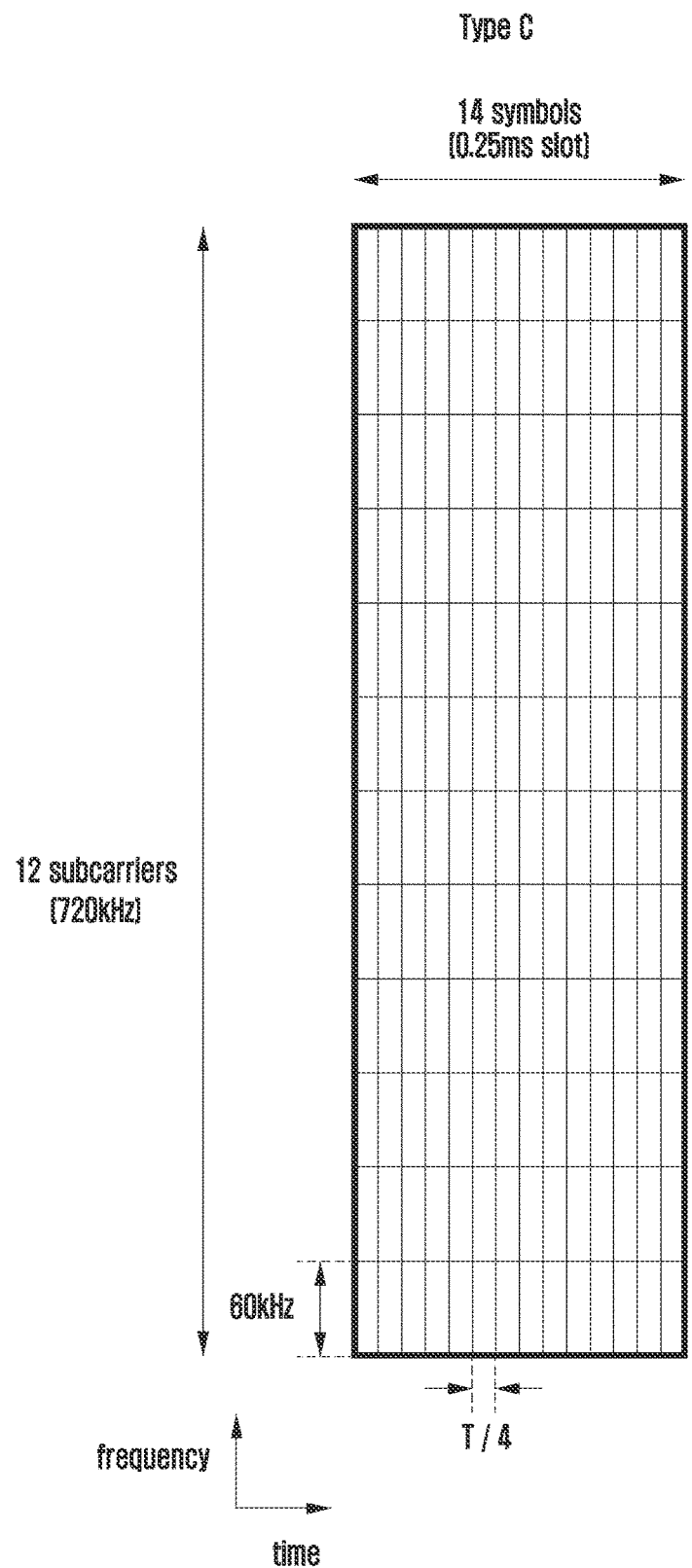
FIG. 4 illustrates an extended frame structure according to an embodiment of the disclosure.

FIGS. 2 to 4 are diagrams illustrating an extended frame structure according to an embodiment of the disclosure.

The examples illustrated in FIGS. 2 to 4 may include a subcarrier spacing, a CP length, a slot length, or the like as an essential parameter set defining the extended frame structure.

At the initial stage of introduction, 5G systems are expected to coexist at least with existing LTE/LTE-A systems or to operate in dual mode. Thereby, existing LTE/LTE-A may provide stable system operation, and the 5G system may serve to provide an improved service. Hence, the extended frame structure of the 5G system may include at least an LTE/LTE-A frame structure or an essential parameter set. FIG. 2 illustrates a 5G frame structure, which is the same as an LTE/LTE-A frame structure, or an essential parameter set. In frame structure type A illustrated in FIG. 2, the subcarrier spacing is 15 kHz, 14 symbols form a slot of 1 ms, and 12 subcarriers (=180 kHz=12×15 kHz) form a physical resource block (PRB).

With reference to FIG. 3, in frame structure type B shown in FIG. 3, the subcarrier spacing is 30 kHz, 14 symbols form a slot of 0.5 ms, and 12 subcarriers (=360 kHz=12×30 kHz) form a PRB. That is, compared to frame structure type A, the subcarrier spacing and the size of the PRB are increased by two times, and the slot length and the symbol length are reduced by two times.

With reference to FIG. 4, in frame structure type C shown in FIG. 4, the subcarrier spacing is 60 kHz, 14 symbols form a subframe of 0.25 ms, and 12 subcarriers (=720 kHz=12×60 kHz) form a PRB. That is, compared to frame structure type A, the subcarrier spacing and the size of the PRB are increased by four times, and the slot length and the symbol length are reduced by four times.

That is, the frame structure type may be generalized such that the subcarrier spacing, CP length, slot length, and the like of an essential parameter set in one frame structure type may be integer times those in another frame structure type, thereby providing high scalability. In addition, a subframe having a fixed length of 1 ms may be defined to indicate a reference time unit regardless of the above frame structure types. Hence, one subframe includes one slot in frame structure type A, one subframe includes two slots in frame structure type B, and one subframe includes four slots in frame structure type C. However, the extended frame structure is not limited to frame structure type A, B or C described above, may be applied to other subcarrier spacings such as 120 kHz and 240 kHz, and may have a different structure.

According to some embodiments, the above frame structure types may be applied in correspondence to various scenarios. In terms of a cell size, since a longer CP length can support a larger cell, frame structure type A may support a relatively larger cell in comparison to frame structure types B and C. In terms of an operating frequency band, since a larger subcarrier spacing is favorable to recover phase noise in a high frequency band, frame structure type C may support a relatively high operating frequency compared to frame structure types A and B. In terms of a service, since a shorter subframe length is favorable to support an ultra-low latency service such as URLLC, frame structure type C is more suitable for a URLLC service compared to frame structure types A and B.

Further, a plurality of frame structure types may be multiplexed in one system and may be operated in an integrated manner.

In NR, one component carrier (CC) or serving cell can be composed of up to 250 or more RBs. Hence, if the terminal always receives a full serving cell bandwidth like LTE, power consumption of the terminal may be extreme; to solve this problem, the base station can support the terminal to change the reception region within the cell by configuring one or more bandwidth parts (BWPs) to the terminal. In NR, the base station may configure an "initial BWP", which is the bandwidth of control resource set (CORESET) #0 (or, common search space (CSS)), to the terminal by using a master information block (MIB). Then, the base station may configure a first BWP of the terminal through RRC signaling, and may notify one or more pieces of BWP configuration information, which may be indicated by downlink control information (DCI) in the future. Thereafter, the base station may indicate which band the terminal will use by notifying a BWP ID through DCI. If the terminal fails to receive DCI on the currently allocated BWP for a specific time or longer, the terminal returns to a "default BWP" and attempts to receive DCI.

Figure 5:
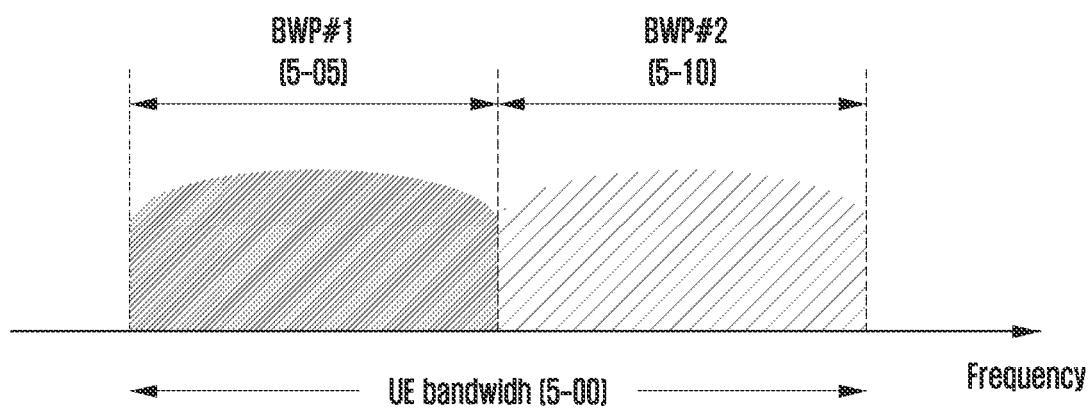
FIG. 5 is a diagram illustrating an example of configuring BWPs in a 5G communication system according to an embodiment of the disclosure.

FIG. 5 is a diagram illustrating an example of configuring BWPs in an NR (5G) communication system according to an embodiment of the disclosure.

With reference to FIG. 5, the UE bandwidth 5-00 may be configured as two BWPs, that is, BWP #1. (5-05) and BWP #2 (5-10). The base station may configure one or multiple BWPs to the terminal, and may configure the following information for each BWP.

TABLE 1

Configuration information 1: bandwidth of BWP
(number of PRBs constituting BWP)
Configuration information 2: frequency location of BWP
(such as an offset value with respect to a reference point,
where the reference point may be the center frequency of a
carrier, synchronization signal, or synchronization signal raster)
Configuration information 3: Numerology of BWP
(e.g., subcarrier spacing, cyclic prefix (CP) length, etc.)
Other information In addition to the configuration information in Table 1, various parameters related to the BWP may be configured in the terminal. The configuration information may be delivered from the base station to the terminal through higher layer signaling, for example, RRC signaling. At least one BWP among the configured one or multiple BWPs may be activated. Whether to activate a configured BWP may be semi-statically delivered from the base station to the terminal through RRC signaling, or may be dynamically delivered through a MAC control element (MAC CE) or DCI.

The configuration about a BWP supported in a 5G system may be used for various purposes. For example, when the bandwidth supported by the terminal is smaller than the system bandwidth, this can be supported through a BWP configuration. For example, a frequency location of the BWP (configuration information 1) in Table 1 may be configured to the terminal, so that the terminal may transmit and receive data at a specific frequency location within the system bandwidth.

As another example, the base station may configure multiple BWPs to the terminal to support different numerologies. For example, to support a specific terminal in data transmission and reception using both a subcarrier spacing of 15 kHz and a subcarrier spacing of 30 kHz, two BWPs may be configured to as to use subcarrier spacings of 15 kHz and 30 kHz, respectively. Different BWPs may be frequency division multiplexed (FDM); if data is to be transmitted and received at a specific subcarrier spacing, the BWP configured with the corresponding subcarrier spacing may be activated.

As another example, for the purpose of reducing power consumption of the terminal, the base station may configure BWPs having different bandwidth sizes to the terminal. For example, when the terminal supports a very large bandwidth, for example, a bandwidth of 100 MHz and always transmits and receives data using the corresponding bandwidth, very large power consumption may be caused. Particularly in a situation where there is no traffic, it is very inefficient in terms of power consumption for the terminal to unnecessarily monitor the downlink control channel for the large bandwidth of 100 MHz. Hence, for the purpose of reducing power consumption of the terminal, the base station may configure a BWP with a relatively small bandwidth, for example, a BWP of 20 MHz to the terminal. In a situation where there is no traffic, the terminal may perform monitoring on the 20 MHz BWP; when data is generated, the terminal can transmit and receive data by using the BWP of 100 MHz according to an indication of the base station.

Figure 6:
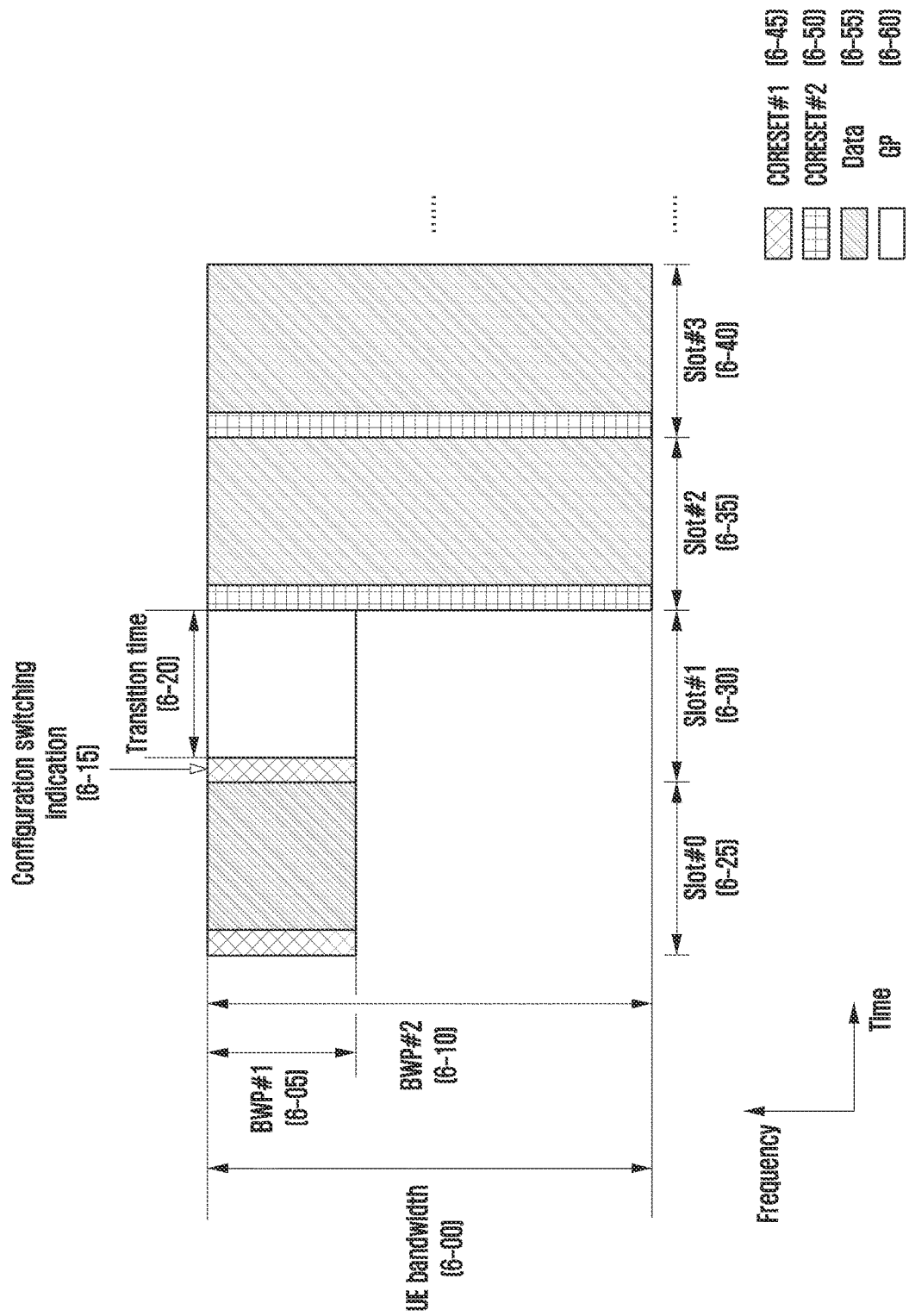
FIG. 6 is a diagram illustrating a method for indicating and switching BWPs according to an embodiment of the disclosure.

FIG. 6 is a diagram illustrating a method for indicating and switching BWPs according to an embodiment of the disclosure.

As in the above description of Table 1, the base station may configure one or multiple BWPs to the terminal, and may notify, as a configuration for each BWP, information about the bandwidth of the BWP, the frequency location of the BWP, the numerology of the BWP. With reference to FIG. 6, two BWPs, BWP #1 (BWP #1, 6-05) and BWP #2 (BWP #2, 6-10) may be configured within the UE bandwidth 6-00 for one terminal. Among the configured BWPs, one or multiple BWPs may be activated, and FIG. 6 illustrates an example in which one BWP is activated. In FIG. 6, among the BWPs configured in slot #0 (6-25), BWP #1 (6-05) is active; the terminal may monitor a downlink control channel (physical downlink control channel (PDCCH)) in control region #1 (6-45) configured on BWP #1 (6-05), and may transmit and receive data 6-55 on BWP #1 (6-05). The control region in which the terminal receives the PDCCH may be different depending on which BWP is activated among the configured BWPs, and the bandwidth through which the terminal monitors the PDCCH may vary correspondingly.

The base station may additionally transmit an indicator for changing the configuration of the BWP to the terminal. Here, changing the configuration for the BWP may be considered the same as activating a specific BWP (e.g., switching activation from BWP A to BWP B). The base station may transmit a configuration switching indicator to the terminal in a specific slot; the terminal may apply, from a specific time point after receiving the configuration switching indicator from the base station, the configuration changed according to the configuration switching indicator to determine the BWP to be activated, and perform monitoring of the PDCCH in the control region configured on the activated BWP.

In FIG. 6, the base station may transmit a configuration switching indication 6-15, which instructs to switch the active BWP from existing BWP #1 (6-05) to BWP #2 (6-10), to the terminal in slot #1 (6-30). After receiving the corresponding indicator, the terminal may activate BWP #2 (6-10) according to the contents of the indicator. Here, a transition time 6-20 for switching the BWP may be required, and the time point for switching and applying the active BWP may be determined accordingly. FIG. 6 illustrates a case in which a transition time 6-20 of one slot is required after receiving the configuration switching indication 6-15. Data transmission and reception may be not performed during the corresponding transition time 6-20 (6-60). Hence, BWP #2 (6-10) may be activated in slot #2 (6-35), and transmission and reception of a control channel and data may be performed on the corresponding BWP.

The base station may configure in advance one or plural BWPs to the terminal through higher layer signaling (e.g., RRC signaling), and activation may be indicated in a manner of mapping the configuration switching indicator 6-15 with one of the BWP configurations preconfigured by the base station. For example, an indicator of $\log_2 N$ bits may indicate one selected from among N preconfigured BWPs. Table 2 below shows an example of indicating configuration information about BWPs by using a 2-bit indicator.

TABLE 2

| Indicator value | BWP configuration |
|---|---|
| 00 | BWP configuration A configured via higher layer signaling |
| 01 | BWP configuration B configured via higher layer signaling |

TABLE 2-continued

| Indicator value | BWP configuration |
|---|---|
| 10 | BWP configuration C configured via higher layer signaling |
| 11 | BWP configuration D configured via higher layer signaling |

The configuration switching indicator 6-15 described above for the BWP may be transmitted from the base station to the terminal in the form of medium access control (MAC) control element (CE) signaling or L1 signaling (e.g., common DCI, group-common DCI, UE-specific DCI).

According to the configuration switching indicator 6-15 described above for the BWP, from which point in time BWP activation is applied is as follows. From which point in time the configuration switching is applied may be determined according to a predefined value (e.g., applied from N (≥1) slots after reception of the configuration switching indicator), the base station may configure it to the terminal via higher layer signaling (e.g., RRC signaling), or it may be transmitted by being partially included in the contents of the configuration switching indicator 6-15. Or, it may be determined by a combination of the above methods. The terminal may apply the changed configuration from the point in time determined by the above method after reception of the configuration switching indicator 6-15 for the BWP.

In NR, the following detailed frequency domain resource allocations (FD-RA) are provided in addition to the frequency domain resource candidate allocation through a BWP indication.

Figure 7:
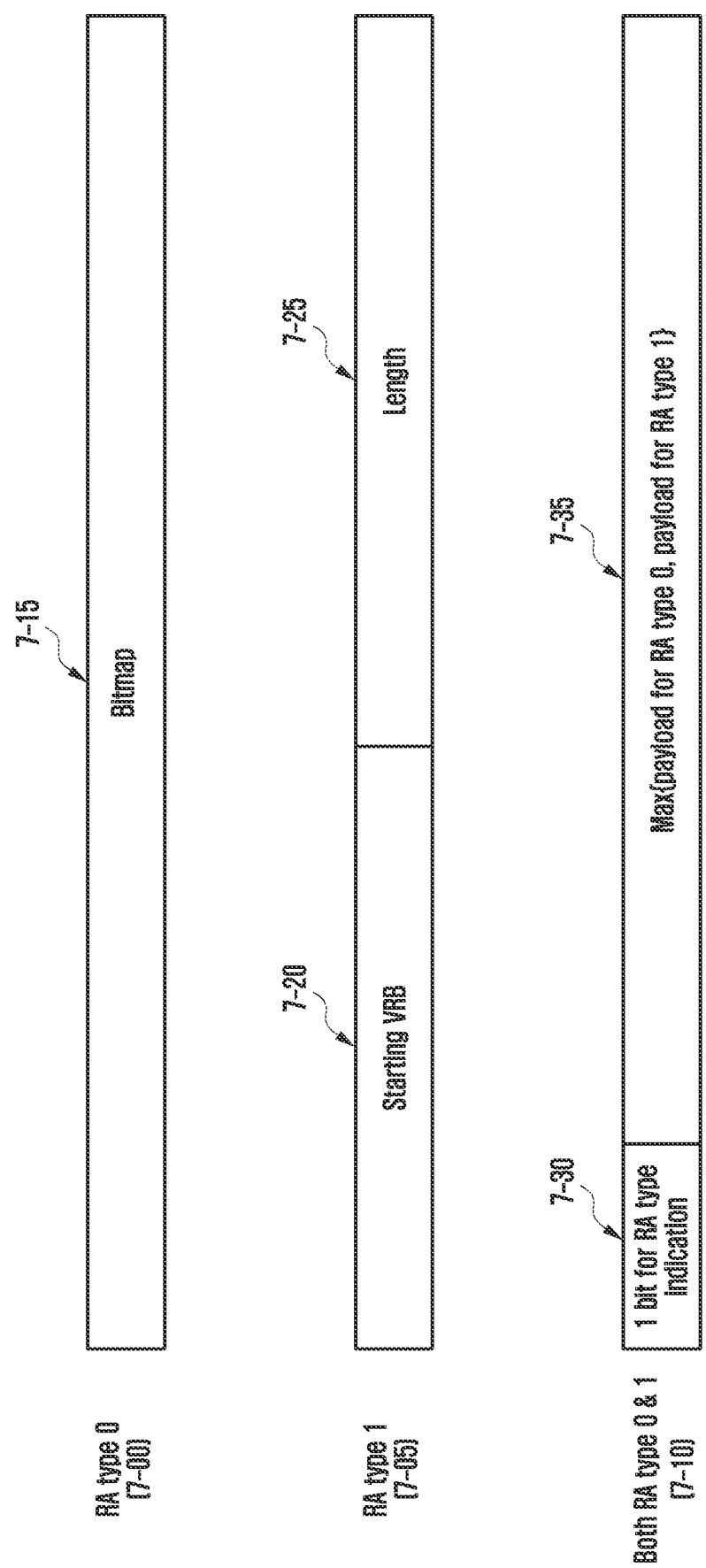
FIG. 7 is a diagram illustrating an example of frequency domain resource allocation for a physical downlink shared channel (PDSCH) according to an embodiment of the disclosure.

FIG. 7 is a diagram illustrating an example of frequency domain resource allocation for the physical downlink shared channel (PDSCH) or physical uplink shared channel (PUSCH) according to an embodiment of the disclosure.

FIG. 7 illustrates three frequency domain resource allocation methods configurable through a higher layer in NR: type 0 (7-00), type 1 (7-05), and dynamic switch 7-10.

When the terminal is configured to use only resource type 0 through higher layer signaling (7-00), some downlink control information (DCI) for allocating a PDSCH or PUSCH to the terminal has a bitmap composed of $N_{RBG}$ bits. The condition for this will be described later. Here, $N_{RBG}$ denotes the number of resource block groups (RBGs) determined as in Table 3 according to the BWP size allocated by a BWP indicator and a higher layer parameter rbg-Size, and data is transmitted on an RBG indicated by 1 of the bitmap.

TABLE 3

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the terminal is configured to use only resource type 1 through higher layer signaling (7-05), some DCI for allocating a PDSCH or PUSCH to the terminal has frequency domain resource allocation information composed of $$\lceil \log_2(N_{RB}^{DL,BWP}(N_{RB}^{DL,BWP}+1)/2)\rceil \text{bits.}$$

Through this, the base station may configure a starting VRB 7-20 and the length 7-25 of frequency domain resources consecutively allocated therefrom.

When the terminal is configured to use both resource type 0 and resource type 1 through higher layer signaling (7-10), some DCI for allocating a PDSCH or PUSCH to the corresponding terminal has frequency domain resource allocation information composed of bits whose number is given by a greater value 7-35 among a payload 7-15 for configuring resource type 0 and a payload (7-20, 7-25) for configuring resource type 1. The condition for this will be described later. Here, one bit 7-30 is attached to the beginning (MSB) of the frequency resource allocation information in the DCI, where the corresponding bit set to 0 indicates use of resource type 0, and the corresponding bit set to 1 indicates use of resource type 1.

Figure 8:
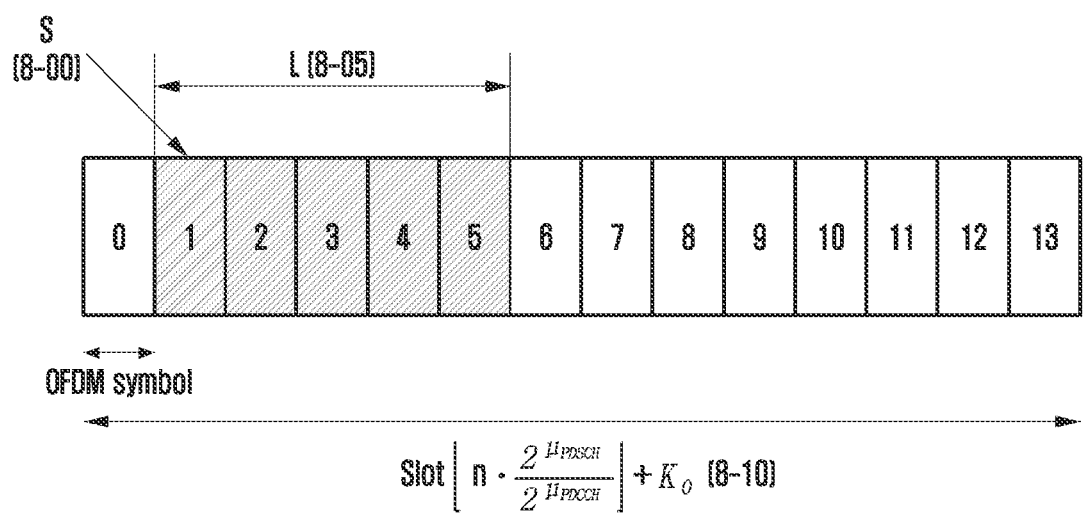
FIG. 8 is a diagram illustrating an example of time domain resource allocation of the PDSCH according to an embodiment of the disclosure.

FIG. 8 is a diagram illustrating an example of time domain resource allocation for the PDSCH or PUSCH according to an embodiment of the disclosure.

With reference to FIG. 8, the base station may indicate a time-domain position of a PDSCH resource allocated to the terminal according to the start position 8-00 and the length 8-05 of OFDM symbols in a slot dynamically indicated based on the subcarrier spacings of a data channel and a control channel configured via higher layer signaling, a scheduling offset value ($K_0$ or $K_2$), and DCI.

In NR, for efficient control channel reception of the terminal, various types of DCI (downlink control information) formats as shown in Table 4 are provided according to purposes.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 1_0 or DCI format 1_1 to schedule a PDSCH for one cell.

DCI format 1_0 includes at least the following pieces of information when transmitted together with a CRC scrambled with cell radio network temporary identifier (C-RNTI), configured scheduling RNTI (CS-RNTI), or MCS-C-RNTI:

Identifier for DCI formats (1 bit): DCI format indicator, which is always set to 1

Frequency domain resource assignment ($\lceil \log_2 (N_{RB}^{DL,BWP}(N_{RB}^{DL,BWP}+1)/2 \rceil$ bits): indicates frequency domain resource allocation. When DCI format 1_0 is monitored in a UE-specific search space, $N_{RB}^{DL,BWP}$ is the size of the active DL BWP; otherwise, $N_{RB}^{DL,BWP}$ is the size of the initial DL BWP. For detailed methods, refer to the frequency domain resource allocation.

Time domain resource assignment (4 bits): indicates time domain resource allocation according to the above description.

VRB-to-PRB mapping (1 bit): 0 indicates non-interleaved VRP-to-PRB mapping, and 1 indicates interleaved VRP-to-PRB mapping.

Modulation and coding scheme (5 bits): indicates the modulation order and coding rate used for PDSCH transmission.

New data indicator (1 bit): indicates whether the PDSCH corresponds to initial transmission or retransmission depending on toggling.

Redundancy version (2 bits): indicates a redundancy version used for PDSCH transmission.

HARQ process number (4 bits): indicates an HARQ process number used for PDSCH transmission.

Downlink assignment index (DAI) (2 bits): DAI indicator.

TPC command for scheduled PUCCH (2 bits): PUCCH power control indicator.

PUCCH resource indicator (3 bits): PUCCH resource indicator, which indicates one of eight resources configured via a higher layer.

PDSCH-to-HARQ_feedback timing indicator (3 bits): HARQ feedback timing indicator, which indicates one of eight feedback timing offsets configured via a higher layer.

DCI format 1_1 includes at least the following pieces of information when transmitted together with a CRC scrambled with C-RNTI, CS-RNTI, or MCS-C-RNTI:

Identifier for DCI formats (1 bit): DCI format indicator, which is always set to 1.

Carrier indicator (0 or 3 bits): indicates a CC (or cell) in which a PDSCH allocated by corresponding DCI is transmitted.

Bandwidth part indicator (0, 1 or 2 bits): indicates a BWP in which a PDSCH allocated by corresponding DCI is transmitted.

Frequency domain resource assignment (payload is determined according to the above frequency domain resource allocation): indicates frequency domain resource allocation, where $N_{RB}^{DL,BWP}$ is the size of an active DL BWP. For detailed methods, refer to the frequency domain resource allocation.

Time domain resource assignment (4 bits): indicates time domain resource allocation according to the foregoing description.

VRB-to-PRB mapping (0 or 1 bit): 0 indicates non-interleaved VRP-to-PRB mapping, and 1 indicates interleaved VRP-to-PRB mapping. When frequency domain resource allocation is set to resource type 0, this is 0 bits.

PRB bundling size indicator (0 or 1 bit): when higher layer parameter prb-BundlingType is not configured or is set to 'static', this is 0 bits; when higher layer parameter prb-BundlingType is set to 'dynamic', this is 1 bit.

Rate matching indicator (0, 1 or 2 bits): indicates a rate matching pattern.

ZP CSI-RS trigger (0, 1 or 2 bits): indicator triggering an aperiodic ZP CSI-RS.

For Transport Block 1:

Modulation and coding scheme (5 bits): indicates a modulation order and a coding rate used for PDSCH transmission.

New data indicator (1 bit): indicates whether a PDSCH corresponds to initial transmission or retransmission depending on toggling.

Redundancy version (2 bits): indicates a redundancy version used for PDSCH transmission.

For Transport Block 2:

Modulation and coding scheme (5 bits): indicates a modulation order and a coding rate used for PDSCH transmission.

New data indicator (1 bit): indicates whether a PDSCH corresponds to initial transmission or retransmission depending on toggling.

Redundancy version (2 bits): indicates a redundancy version used for PDSCH transmission.

HARQ process number (4 bits): indicates an HARQ process number used for PDSCH transmission.

Downlink assignment index (0, 2 or 4 bits): DAI indicator.

TPC command for scheduled PUCCH (2 bits): PUCCH power control indicator.

PUCCH resource indicator (3 bits): PUCCH resource indicator, which indicates one of eight resources configured via a higher layer.

PDSCH-to-HARQ_feedback timing indicator (3 bits): HARQ feedback timing indicator, which indicates one of eight feedback timing offsets configured via a higher layer.

Antenna port (4, 5 or 6 bits): indicates a DMRS port and a CDM group without data.

Transmission configuration indication (0 or 3 bits): TCI indicator.

SRS request (2 or 3 bits): SRS transmission request indicator.

CBG transmission information (0, 2, 4, 6 or 8 bits): indicator indicating whether code block groups in allocated PDSCH are transmitted. 0 indicates that the corresponding CBG is not transmitted, and 1 indicates that the corresponding CBG is transmitted.

CBG flushing-out information (0 or 1 bit): indicator indicating whether previous CBGs are contaminated. 0 indicates that the CBGs may be contaminated, and 1 indicates that the CBGs may be usable (combinable) in retransmission reception.

DMRS sequence initialization (0 or 1 bit): DMRS scrambling ID selection indicator.

The number of DCIs having different sizes that a terminal can receive per slot in the corresponding cell is up to 4. The number of DCIs having different sizes scrambled with a C-RNTI that a terminal can receive per slot in the corresponding cell is up to 3.

In NR, the terminal performs blind decoding in a specific time and frequency domain to receive a PDCCH including DCI. The base station may configure a control resource set (CORESET) and a search space to the terminal through higher layer signaling to provide the terminal with a time and frequency domain, a mapping scheme, and the like for performing blind decoding. The base station may configure up to 3 CORESETs and up to 10 search spaces for each BWP configured in the terminal. For example, the base station and the terminal may exchange signaling information as shown in Table 5 below to deliver information about the CORESET.

TABLE 5

| ControlResourceSet information element |
| --- |
| -- ASN1START<br>-- TAG-CONTROLRESOURCESET-START<br>ControlResourceSet ::= SEQUENCE {<br>controlResourceSetId ControlResourceSetId,<br>frequencyDomainResources BIT STRING (SIZE (45)),<br>duration INTEGER (1..maxCoReSetDuration),<br>cce-REG-MappingType CHOICE {<br>interleaved SEQUENCE {<br>reg-BundleSize ENUMERATED {n2, n3, n6},<br>interleaverSize ENUMERATED {n2, n3, n6},<br>shiftindex INTEGER(0..maxNrofPhysicalResourceBlocks-1) OPTIONAL -- Need S<br>},<br>nonInterleaved NULL<br>},<br>precoderGranularity ENUMERATED {sameAsREG-bundle, allContiguousRBs},<br>tci-StatesPDCCH-ToAddList SEQUENCE(SIZE (1..maxNrofTCI-StatesPDCCH)) OF TCI-StateId OPTIONAL, -- Cond NotSIB1-initialBWP<br>tci-StatesPDCCH-ToReleaseList SEQUENCE(SIZE (1..maxNrofTCI-StatesPDCCH)) OF TCI-StateId OPTIONAL, -- Cond NotSIB1-initialBWP<br>tci-PresentInDCI ENUMERATED {enabled} OPTIONAL, -- Need S<br>pdcch-DMRS-ScramblingID INTEGER (0..65535) OPTIONAL, -- Need S<br>...<br>}<br>-- TAG-CONTROLRESOURCESET-STOP<br>-- ASN1STOP |

The signaling information ControlResourceSet includes information about each CORESET. Information included in the signaling information ControlResourceSet may have the following meaning.

controlResourceSetId: indicates a CORESET index.

frequencyDomainResources: indicates frequency resource information of the CORESET. For all PRBs included in the BWP, 6 RBs are grouped and 1 bit indicates whether the corresponding RB group is included in the CORESET frequency resource. (1: included in CORESET, 0: not included in CORESET)

duration: symbol level time resource information of the CORESET. It has a value of 1, 2 or 3.

cce-REG-MappingType: indicates whether control channel elements (CCEs) mapped to the CORESET are interleaved. If CCEs are interleaved, additional information about interleaving (reg-BundleSize, interleaverSize, shiftIndex) is provided.

precoderGranularity: indicates information about frequency resource precoding of the CORESET. The precoder size may be the same as the resource element group (REG) bundle size or the size of the entire frequency resources of the CORESET.

tci-StatePDCCH-ToAddList, tci-StatePDCCH-ToReleaseList: indicate TCI (transmission configuration indication) state sets of the CORESET that can be activated. One of the TCI state sets of the CORESET that can be activated may be activated through higher layer signaling (e.g., MAC CE). If the CORESET is a CORESET configured in the initial access process, no TCI state set may be configured. TCI states will be described later.

tci-PresentInDCI: indicates whether an indicator indicating a TCI state of the PDSCH is included in the DCI transmitted on the PDCCH included in the CORESET.

Pdcch-DMRS-ScramblingID: scrambling sequence index of the DMRS transmitted on the PDCCH included in the CORESET The terminal may perform blind decoding to receive a PDCCH by referring to the information about the CORESET described above.

In NR, the base station may transmit the terminal information about a quasi co-location (QCL) relationship between antenna ports transmitting downlink channels (e.g., PDSCH DMRS port, PDCCH DMRS port, or CSI-RS port of CSI-RS), so that the terminal may smoothly receive a downlink channel (e.g., PDCCH or PDSCH) and decode it. A QCL relationship between antenna ports may have one of a total of four QCL types.

'QCL-typeA': {Doppler shift, Doppler spread, average delay, delay spread}
'QCL-typeC': {Doppler shift, average delay}
'QCL-typeD': {Spatial RX parameter}
'QCL-typeB': {Doppler shift, Doppler spread}, If two different antenna ports share a part of the QCL types described above, or one antenna port refers to a part of the QCL type of the other antenna port, the terminal may assume that the two antenna ports share parameters supported in the shared or referenced QCL type and thus have the same values.

The base station may configure a TCI state to transfer information about a QCL relationship between antenna ports to the terminal. The TCI state includes information about one or two downlink RSs and supported QCL types. For example, the base station and the terminal may exchange signaling information as described in Table 6 to transfer information about the TCI state.

TABLE 6

TCI-State information element

-- ASN1START
-- TAG-TCI-STATE-START
TCI-State ::= SEQUENCE {
tci-StateId TCI-StateId,
qcl-Type1 QCL-Info,
qcl-Type2 QCL-Info OPTIONAL, -- Need R
...
}
QCL-Info ::= SEQUENCE {
cell ServCellIndex OPTIONAL, -- Need R
bwp-Id BWP-Id OPTIONAL, -- Cond CSI-RS-Indicated
referenceSignal CHOICE {
csi-rs NZP-CSI-RS-ResourceId,
ssb SSB-Index
},
qcl-Type ENUMERATED {typeA, typeB, typeC, typeD},
...
}
-- TAG-TCI-STATE-STOP
-- ASN1STOP The signaling information TCI-state includes information about each TCI state. According to the signaling information, each TCI state includes a TCI state index and information about one or two types of QCL-Info (qcl-Type1, qcl-Type2). Qcl-Type1 or qcl-Type2 provides information about the index of a cell in which an RS is configured, the index of a BWP in which an RS is included, an RS providing information relating to parameters supported by a QCL type according to QCL types, and one of a total of four QCL types. qcl-Type1 may have one QCL type among 'QCL-typeA', 'QCL-typeB', or 'QCL-typeC' in the total of four QCL types, and qcl-Type2 may have 'QCL-typeD'. In consideration of an activated TCI state at the antenna port transmitting a downlink channel, the terminal may receive and decode a downlink channel based on the RS referenced in the activated TCI state and the QCL type supported therein.

NR has a CSI framework used by the base station to instruct the terminal to measure and report channel state information (CSI). The CSI framework of NR may be composed of at least two elements including a resource setting and a report setting, and the report setting may have a connection relationship with each other by referring to at least one resource setting ID.

According to an embodiment of the disclosure, the resource setting may include information related to a reference signal (RS) for the terminal to measure channel state information. The base station may configure at least one resource setting to the terminal. For example, the base station and the terminal may exchange signaling information as described in Table 7 below to deliver information about the resource setting.

TABLE 7

CSI-ResourceConfig information element

-- ASN1START
-- TAG-CSI-RESOURCECONFIG-START
CSI-ResourceConfig ::= SEQUENCE {
csi-ResourceConfigId,
csi-RS-ResourceSetList CHOICE {
nzp-CSI-RS-SSB SEQUENCE {
nzp-CSI-RS-ResourceSetList SEQUENCE (SIZE (1..maxNrofNZP-CSI-RS-ResourceSetsPerConfig)) OF NZP-CSI-RS-ResourceSetId OPTIONAL, -- Need R
csi-SSB-ResourceSetList SEQUENCE (SIZE (1..maxNrofCSI-SSB-ResourceSetsPerConfig)) OF CSI-SSB-ResourceSetId OPTIONAL -- Need R
},
csi-IM-ResourceSetList SEQUENCE (SIZE (1..maxNrofCSI-IM-ResourceSetsPerConfig)) OF CSI-IM-ResourceSetId
},
bwp-Id BWP-Id,
resourceType ENUMERATED { aperiodic, semiPersistent, periodic },
...
}
-- TAG-CSI-RESOURCECONFIG-STOP
-- ASN1STOP The signaling information CSI-ResourceConfig may include information about each resource setting. According to the above signaling information, each resource setting may include a resource setting index (csi-ResourceConfigId), a BWP index (bwp-ID), time domain transmission configuration of resources (resourceType), or a resource set list (csi-RS-ResourceSetList) including at least one resource set. Time domain transmission configuration of resources may be configured as aperiodic transmission, semi-persistent transmission, or periodic transmission. The resource set list may be a set including resource sets for channel measurement, or a set including resource sets for interference measurement. If the resource set list is a set including resource sets for channel measurement, each resource set may include at least one resource, which may correspond to an index of a CSI reference signal (CSI-RS) resource or a synchronization/broadcast channel block (SS/PBCH block, SSB). If the resource set list is a set including resource sets for interference measurement, each resource set may include at least one interference measurement resource (CSI interference measurement, CSI-IM). For example, when a resource set includes a CSI-RS, the base station and the terminal may exchange signaling information as described in Table 8 below to deliver information about the resource set.

TABLE 8

NZP-CSI-RS-ResourceSet information element

-- ASN1START
-- TAG-NZP-CSI-RS-RESOURCESET-START
NZP-CSI-RS-ResourceSet ::= SEQUENCE {
nzp-CSI-ResourceSetIdNZP-CSI-RS-ResourceSetId,
nzp-CSI-RS-Resources SEQUENCE (SIZE (1..maxNrofNZP-CSI-RS-ResourcesPerSet)) OF NZP-CSI-RS-ResourceId,
repetition ENUMERATED { on, off } OPTIONAL, -- Need S
aperiodicTriggeringOffset INTEGER(0..6) OPTIONAL, -- Need S
trs-Info ENUMERATED {true} OPTIONAL, -- Need R
...
}
-- TAG-NZP-CSI-RS-RESOURCESET-STOP
-- ASN1STOP The signaling information NZP-CSI-RS-ResourceSet includes information about each resource set. According to the above signaling information, each resource set may include at least a resource set index (nzp-CSI-ResourceSetId) or information about an included CSI-RS index set (nzp-CSI-RS-Resources), and may include a portion of information about a spatial domain transmission filter of an included CSI-RS resource (repetition), or information about whether an included CSI-RS resource is for a tracking purpose (trs-Info).

A CSI-RS may be the most representative reference signal included in a resource set. The base station and the terminal may exchange signaling information as described in Table 9 below to deliver information about the CSI-RS resource.

TABLE 9

NZP-CSI-RS-Resource information element

-- ASN1START
-- TAG-NZP-CSI-RS-RESOURCE-START
NZP-CSI-RS-Resource ::= SEQUENCE {
nzp-CSI-RS-ResourceId NZP-CSI-RS-ResourceId,
resourceMapping CSI-RS-ResourceMapping,
powerControlOffset INTEGER (-8..15),
powerControlOffsetSS ENUMERATED{db-3, db0, db3, db6} OPTIONAL, -- Need R
scramblingID,
periodicityAndOffset CSI-ResourcePeriodicityAndOffset OPTIONAL, -- Cond
PeriodicOrSemiPersistent
qcl-InfoPeriodicCSI-RS TCI-StateId OPTIONAL, -- Cond Periodic
...
}
-- TAG-NZP-CSI-RS-RESOURCE-STOP
-- ASN1STOP The signaling information NZP-CSI-RS-Resource includes information about each CSI-RS. The information included in the signaling information NZP-CSI-RS-Resource may have the following meaning.

nzp-CSI-RS-ResourceId: CSI-RS resource index resourceMapping: resource mapping information of the CSI-RS resource powerControlOffset: ratio between PDSCH EPRE (energy per RE) and CSI-RS EPRE powerControlOffsetSS: ratio between SS/PBCH block EPRE and CSI-RS EPRE scramblingID: scrambling index of a CSI-RS sequence periodicityAndOffset: transmission periodicity and slot offset of a CSI-RS resource qcl-InfoPeriodicCSI-RS: TCI-state information when the corresponding CSI-RS is a periodic CSI-RS "resourceMapping" included in the signaling information NZP-CSI-RS-Resource may indicate resource mapping information of a CSI-RS resource, and may include resource element (RE) mapping of frequency resources, number of ports, symbol mapping, CDM type, frequency resource density, and frequency band mapping information. The number of ports, frequency resource density, CDM type, and time-frequency domain RE mapping, which may be configured through this, may have values given in one of the rows in Table 10.

TABLE 10

| Row | Ports X | Density p | cdm-Type | $(\bar{k}_q, \bar{l}_q)$ | CDM group index j | $k_q'$ | $l_q'$ |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1),$ $(k_2, l_0, +1), (k_0, l_1), (k_1, l_1), (k_2, l_1), (k_0, l_1 + 1),$ $(k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |

TABLE 10-continued

| Row | Ports X | Density p | cdm-Type | $(\bar{k}_q, \bar{l}_q)$ | CDM group index j | $k_q'$ | $l_q'$ |
|---|---|---|---|---|---|---|---|
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ $(k_0, l_1), (k_2, l_1), (k_3, l_1), (k_0, l_1),$ $(k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1),$ $(k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

Table 10 shows a frequency resource density, a CDM type, frequency and time domain start positions ($\bar{k}$, $\bar{l}$) of a CSI-RS component RE pattern, and the number of frequency domain REs (k') and the number of time domain REs (l') of a CSI-RS component RE pattern, which are configurable according to the number of CSI-RS ports (X). The CSI-RS component RE pattern described above may be a basic unit for configuring CSI-RS resources. The CSI-RS component RE pattern may be composed of YZ REs, where Y=1+max (k') number of frequency domain REs and Z=1+max (l') number of time domain REs. If the number of CSI-RS ports is 1, the position of a CSI-RS RE may be designated in a physical resource block (PRB) without restriction on subcarriers, and may be specified by a bitmap of 12 bits. If the number of CSI-RS ports is {2, 4, 8, 12, 16, 24, 32}, and Y is equal to 2, the position of a CSI-RS RE may be designated at every two subcarriers in a PRB, and may be specified by a bitmap of 6 bits. If the number of CSI-RS ports is 4, and Y is equal to 4, the position of a CSI-RS RE may be designated at every four subcarriers in a PRB, and may be specified by a bitmap of 3 bits. Similarly, the position of a time domain RE may be specified by a bitmap having a total of 14 bits. Here, according to the Z value in Table 10, the length of a bitmap can be changed along frequency position designation, but the principle is similar to the foregoing description and a repeated description will be omitted hereinafter.

Unlike an existing system, the NR system can support all services including a service having very short transmission latency and a service requiring a high connection density as well as a service requiring a high data rate. In a wireless communication network including multiple cells, transmission and reception points (TRPs), or beams, coordinated transmission between cells, TRPs, and/or beams is one of the element technologies that can increase the strength of a signal received by the terminal, or efficiently perform interference control between cells, TRPs, and/or beams to satisfy the various service requirements.

Joint transmission (JT) is a representative transmission technology for the coordinated communication described above, and it is possible to increase the strength of a signal received by a terminal by supporting the terminal by use of different cells, TRPs, and/or beams through this technology. Meanwhile, as the characteristics of channels between a terminal and a cell, TRP, and/or beam can be significantly different from each other, it is necessary to apply different precoding, MCS, and resource allocation to links between a terminal and a cell, TRP, and/or beam. In particular, in the case of non-coherent joint transmission (NC-JT) supporting non-coherent precoding between cells, TRPs, and/or beams, it becomes important to configure individual downlink transmission information for each cell, TRP, and/or beam.

Figure 9:
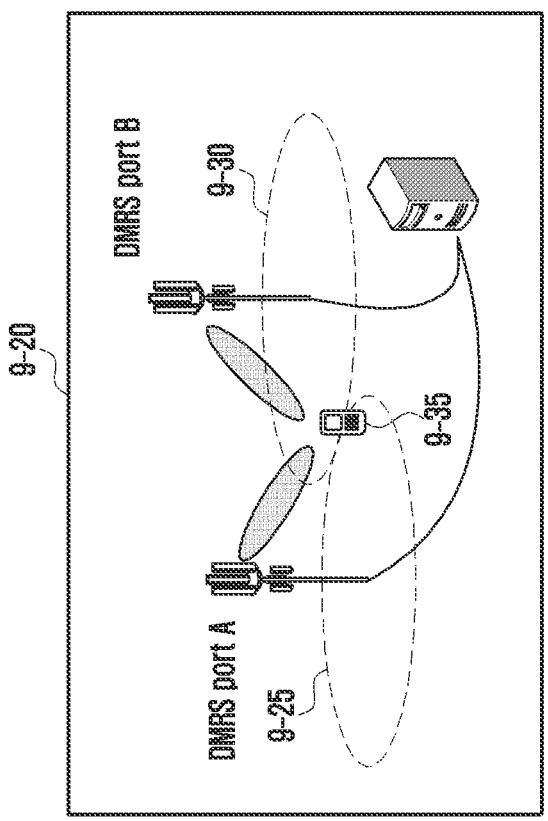
FIG. 9 is a diagram illustrating examples of a radio resource allocation process for each TRP depending upon joint transmission (JT) techniques and situations according to an embodiment of the disclosure.
Figure 9:
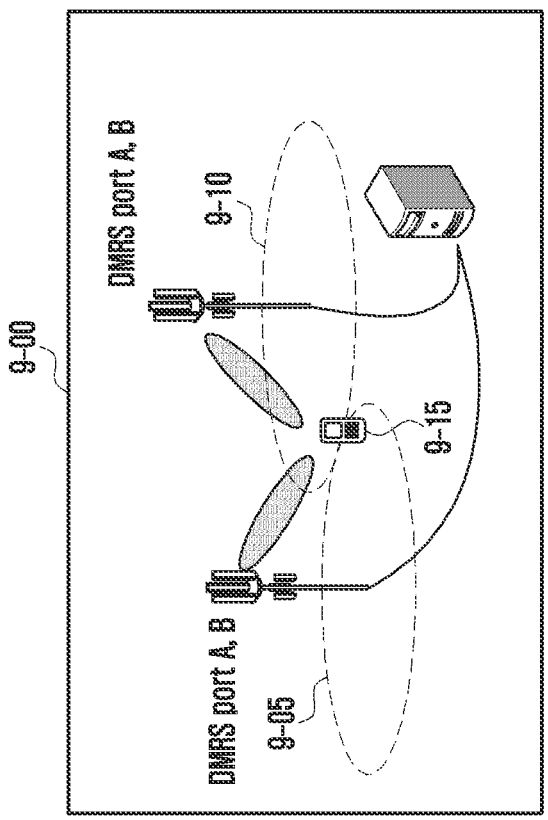

FIG. 9 is a diagram illustrating examples of a radio resource allocation process for each TRP depending upon joint transmission (JT) techniques and situations according to an embodiment of the disclosure.

In FIG. 9, indicia 9-00 illustrates coherent joint transmission (C-JT) supporting coherent precoding between cells, TRPs, and/or beams. In C-JT, TRP A (9-05) and TRP B (9-10) transmit identical data (PDSCH), and joint precoding is performed in multiple TRPs. This means that TRP A (9-05) and TRP B (9-10) transmit the same DMRS ports (e.g., DMRS ports A and B from both of two TRPs) for reception of the same PDSCH. In this case, the terminal 9-15 will receive one piece of DCI information for receiving one PDSCH demodulated by DMRS ports A and B.

In FIG. 9, indicia 9-20 illustrates non-coherent joint transmission (NC-JT) supporting non-coherent precoding between cells, TRPs, and/or beams. In NC-JT, different PDSCHs are transmitted from the cells, TRPs, and/or beams, and separate precoding may be applied to each PDSCH. This means that TRP A (9-25) and TRP B (9-30) transmit different DMRS ports (e.g., DMRS port A from TRP A, and DMRS port B from TRP B) for reception of different PDSCHs. In this case, the terminal 9-35 will receive two types of DCI information for receiving PDSCH A demodulated by DMRS port A and PDSCH B demodulated by DMRS port B.

Meanwhile, in embodiments of the disclosure, "a case of NC-JT" or "a case in which NC-JT is applied" can be variously interpreted in accordance with a situation, such as "a case where the terminal receives one or more PDSCHs simultaneously on one BWP", "a case where the terminal receives a PDSCH based on two or more TCI indications simultaneously on one BWP", and "a case where a PDSCH received by the terminal is associated with one or more demodulation reference signal (DM-RS) port groups", but the foregoing expressions are used for convenience of explanation.

Further, in embodiments of the disclosure, a terminal in a cooperative communication environment may receive information from multiple TRPs having various channel qualities, and among the TRPs, a TRP that has the best channel quality and thus provides pieces of main control information is named a main TRP, and the remaining TRPs are named cooperative TRPs.

Further, in embodiments of the disclosure, a "TRP" can be replaced with various terms, such as, a "panel" or a "beam" in practical applications.

To enable smooth downlink transmission between the base station and the terminal, the terminal is required to normally receive a PDCCH transmitted by the base station. If the terminal is unable to normally receive a PDCCH, this may imply that a beam failure has occurred between the terminal and the base station. The criterion and method for determining whether a terminal is able to normally receive a PDCCH will be described later. The NR system supports a beam failure recovery (BFR) procedure for coping with a dynamic beam failure between the base station and the terminal to enable smooth downlink transmission.

The BFR procedure in an NR system may be divided into four main processes. The first process is a process of detecting a beam failure, and may be called a beam failure detection (BFD) process and will be described later. In the BFD process, the terminal determines whether to receive a PDCCH normally, and if determining to be unable to normally receive a PDCCH, the terminal reports a beam failure to a higher layer. The higher layer of the terminal may detect a beam failure through the reporting, and may determine whether to perform the next process of BFR. The criterion of determining whether a terminal can normally receive a PDCCH is a hypothetical PDCCH reception block error rate (BLER) of the terminal, and the terminal may determine the same by comparing this with a preset threshold. To calculate the hypothetical PDCCH reception BLER of the terminal, a reference signal (RS) set is required for BFD, and this will be referenced later as a BFD RS set. The BFD RS set may include up to two RSs, and the corresponding RS may be a periodic CSI-RS transmitted through a single port, or a synchronization/broadcast channel block (SS/PBCH block, SSB). A BFD RS set may be configured through higher layer signaling of the base station. If a BFD RS set is not configured through higher layer signaling, a part or all of RSs referenced in an activated TCI state of CORESET(s) configured for PDCCH monitoring of the UE may be included in the BFD RS set. If there are two or more RSs referenced in a TCI state, an RS referencing 'QCL-typeD' including beam information may be included in the BFD RS set. The terminal may calculate a hypothetical PDCCH reception BLER based on only an RS referenced in an activated TCI state of CORESET(s) configured for PDCCH monitoring among the RSs belonging to the BFD RS set. The terminal may calculate a hypothetical PDCCH reception BLER with reference to Table. 11 below.

TABLE 11

| Attribute | Value for BLER |
| --- | --- |
| DCI format | 1-0 |
| Number of control OFDM symbols | Same as the number of symbols of CORESET QCLed with respective CSI-RS for BFD |
| Aggregation level (CCE) | 8 |
| Ratio of hypothetical PDCCH RE energy to average CSI-RS RE energy | 0 dB |
| Ratio of hypothetical PDCCH DMRS energy to average CSI-RS RE energy | 0 dB |
| Bandwidth (MHz) | Same as the number of PRBs of CORESET QCLed with respective CSI-RS for BFD |
| Sub-carrier spacing (kHz) | Same as the SCS of CORESET QCLed with respective CSI-RS for BFD |
| DMRS precoder granularity | REG bundle size |
| REG bundle size | 6 |
| CP length | Same as the CP length of CORESET QCLed with respective CSI-RS for BFD |
| Mapping from REG to CCE | Distributed |

Table 11 provides a configuration about a hypothetical PDCCH referenced by the terminal when calculating a hypothetical PDCCH reception BLER. With reference to Table 11, the terminal may calculate a hypothetical PDCCH reception BLER under an assumption of the number of OFDM symbols of a CORESET(s) having an activated TCI state referring to an RS included in the BFD RS set, a bandwidth, a subcarrier spacing, and a CP length. The terminal calculates a hypothetical PDCCH reception BLER for each CORESET having an activated TCI state referring to an RS included in the BFD RS set; if the hypothetical PDCCH reception BLERs for all CORESETs exceed the preset threshold, a beam failure indication is reported to a higher layer. When the higher layer of the terminal receives a beam failure indication report, it increments the beam failure instance count; when the count value reaches a set maximum value, it can determine whether to perform the next process of BFR; and it can refer to the following parameters configured for a higher layer operation process.

beamFailureInstanceMaxCount: the maxim number of times of beam failure indication reporting from a lower layer of the terminal, required for performing the next process of BFR beamFailureDetectionTimer: a timer setting for initializing the number of times of beam failure reporting of the terminal The second process in the BFR procedure of the NR system is a process for finding a new beam having a good channel state, and it will be called a new candidate beam identification process and described later. When the higher layer of the terminal detects a beam failure and determines to initiate a process for searching for a new beam, it may request the terminal to report information about a new candidate beam, for example, L1-reference signal received power (RSRP). For the terminal to calculate information about a new candidate beam, the base station may configure a candidate beam RS set to the terminal through higher layer signaling. The candidate beam RS set may include up to 16 RSs, and each RS may be a periodic CSI-RS or an SSB. When the higher layer of the terminal requests the terminal to report information about a new candidate beam, the terminal reports index information and L1-RSRP measurement values for RSs having an L1-RSRP value greater than an RSRP threshold set through higher layer signaling, among the RSs belonging to the candidate beam RS set. The higher layer of the terminal may obtain information about new beams having a good channel state through reporting.

When the higher layer of the terminal obtains information about new beams having a good channel state, it selects one of them and notifies the physical layer of the selected one, and the terminal transmits a request signal for BFR to the base station. This corresponds to the third process of the BFR procedure, and will be described later as a BFR request process. The higher layer of the terminal selects, from the candidate beam RS set, a new RS to be referenced by the terminal for a BFR request based on information about the new beam, and notifies the physical layer of the selected new RS. The terminal may obtain configuration information on transmission of a physical random access channel (PRACH) through which the BFR request is to be transmitted, based on new RS information for the BFR request and BFR request resource information configured through higher layer signaling. For example, the base station and the terminal may exchange higher layer signaling information as described in Table 12 below to deliver configuration information about PRACH transmission through which a BFR request is to be transmitted.

TABLE 12

BeamFailureRecoveryConfig information element

```
-- ASN1START
-- TAG-BEAMFAILURERECOVERYCONFIG-START
BeamFailureRecoveryConfig ::= SEQUENCE {
rootSequenceIndex-BFR INTEGER (0..137) OPTIONAL, -- Need M
rach-ConfigBFR RACH-ConfigGeneric OPTIONAL, -- Need M
rsrp-ThresholdSSB RSRP-Range OPTIONAL, -- Need M
candidateBeamRSList SEQUENCE (SIZE(1..maxNrofCandidateBeams)) OF PRACH-
ResourceDedicatedBFR OPTIONAL, -- Need M
ssb-perRACH-Occasion ENUMERATED {oneEighth, oneFourth, oneHalf, one, two,
four, eight, sixteen} OPTIONAL, -- Need M
ra-ssb-OccasionMaskIndex INTEGER (0..15) OPTIONAL, -- Need M
recoverySearchSpaceId SearchSpaceId OPTIONAL, -- Need R
ra-Prioritization RA-Prioritization OPTIONAL, -- Need R
beamFailureRecoveryTimer ENUMERATED {ms10, ms20, ms40, ms60, ms80,
ms100, ms150, ms200} OPTIONAL, -- Need M
...,
[[
msg1-SubcarrierSpacing-v1530 SubcarrierSpacing OPTIONAL -- Need M
]]
}
PRACH-ResourceDedicatedBFR ::= CHOICE {
ssb BFR-SSB-Resource,
csi-RS BFR-CSIRS-Resource
}
BFR-SSB-Resource ::= SEQUENCE {
ssb SSB-Index,
ra-PreambleIndex INTEGER (0..63),
...
}
BFR-CSIRS-Resource ::= SEQUENCE {
csi-RS NZP-CSI-RS-ResourceId,
ra-OccasionList SEQUENCE (SIZE(1..maxRA-OccasionsPerCSIRS)) OF INTEGER
(0..maxRA-Occasions-1) OPTIONAL, -- Need R
ra-PreambleIndex INTEGER (0..63) OPTIONAL, -- Need R
...
}
-- TAG-BEAMFAILURERECOVERYCONFIG-STOP
-- ASN1STOP
```

The higher layer signaling information BeamFailureRecoveryConfig includes information about PRACH transmission through which a BFR request is to be transmitted. The information included in BeamFailureRecoveryConfig may have the following meanings. That is, BeamFailureRecoveryConfig may include the following information.

rootSequenceIndex-BFR: the root sequence index of a sequence used for PRACH transmission rach-ConfigBFR: includes, among parameters for PRACH transmission, PRACH configuration index, number of frequency resources, frequency resource starting point, response monitoring window, and parameter for adjustment of the strength of PRACH transmission rsrp-ThresholdSSB: an RSRP threshold allowing a new beam to be selected among the RSs included in the candidate beam RS set candidateBeamRSList: candidate beam RS set ssb-perRACH-Occasion: the number of SSBs connected to a random access channel (RACH) transmission occasion ra-ssb-OccasionMaskIndex: a PRACH mask index for selecting a random access resource of the terminal recoverySearchSpaceId: a search space index for receiving a PDCCH used by the base station to transmit a random access response (RAR) signal in response to a BFR request ra-Prioritization: a parameter set used in a prioritized random access process beamFailureRecoveryTimer: a timer for initializing a configuration about a PRACH resource through which a BFR request is to be transmitted msg1-SubcarrierSpacing-v1530: a subcarrier spacing for PRACH transmission through which a BFR request is to be transmitted The terminal may transmit a BFR request signal to the base station by referring to configuration information about PRACH transmission through which a BFR request is to be transmitted.

The fourth process of the BFR procedure in the NR system is a process in which the base station having received a BFR request signal from the terminal transmits a response signal to the terminal, and it will be described later as a gNB response process. The signaling information BeamFailureRecoveryConfig among the configuration parameters for BFR includes a search space index for receiving a PDCCH used by the base station to transmit a random access response signal in response to a BFR request. The base station may transmit a PDCCH by using resources of a search space configured for a response. When the terminal receives a PDCCH through a search space for receiving the PDCCH, the terminal determines that the BFR procedure is ended. When the terminal receives a PDCCH through a search space for receiving the PDCCH, the base station may indicate, to the terminal, a new beam configuration for PDCCH or PUCCH transmission.

The disclosure provides a BFR method and process in terms of a simplified procedure in an NR system considering network cooperative communication, and the corresponding method and process will be described later as partial BFR. Partial BFR may be defined as performing BFR by using only some of the existing BFR procedures of the NR system according to various embodiments of the disclosure as described below, or as partially performing existing BFR by simplifying some of all processes.

In the current NR system, a BFD RS set may include up to two RSs, and the terminal may be configured with information on an RS belonging to the BFD RS set via higher layer signaling from the base station; if the BFD RS set is not configured through higher layer signaling, the terminal may include, in the BFD RS set, up to two of some or all of the RSs referenced in an activated TCI state of CORESET(s) configured for PDCCH monitoring. In this case, since the base station cannot obtain (information about the BFD RS set determined by the terminal, it may have low understanding of a BFR request signal from the terminal.

As another problem, while the BFD RS set can include up to two RSs, up to three CORESETs may be configured for PDCCH monitoring of the terminal in the current NR system. Further, in the Release 16 NR system, in the case of multiple PDCCH-based multi-TRP transmission, the maximum number of CORESETs per BWP has been increased to 5; in Release 16 NR-UE also, there has been a discussion about increasing the maximum number of CORESETs per BWP to support wideband operation. Hence, like existing BFD operation, if hypothetical PDCCH reception BLERs are calculated for all RSs in the BFD RS set with reference to Table 11 above, and if beam failure indication reporting to a higher layer is performed only when all the BLER values exceed the threshold, the delay time to proceed to the rest of the BFR process may be increased, and a situation in which only a BLER value for a specific RS in the BFD RS set exceeds the threshold cannot be detected. Therefore, if the BFD RS set is not configured to the terminal through higher layer signaling, it is possible to perform the BFR procedure with a low delay time by increasing the efficiency of the BFD process for determining whether smooth downlink transmission between the base station and the terminal is possible, in a manner of making a configuration permitting a beam failure indication to be issued even with some of RSs in the BFD RS set selected among RSs referenced in an activated TCI state of the CORESET(s) configured for PDCCH monitoring of the terminal, configuring plural BFD RS sets to the terminal via higher layer signaling, or indicating a scheme for arbitrarily selecting plural BFD RS sets to the terminal by the base station.

Further, in the current NR system, if the base station configures a BFD RS set to the terminal via higher layer signaling, the RS in the corresponding configuration cannot be changed. The terminal may detect a beam failure based on only a RS referenced in an activated TCI state of the CORESET configured for PDCCH monitoring among RSs included in the BFD RS set. Hence, according to the foregoing description, when a BFD RS set is configured through higher layer signaling, if a specific RS among the RSs belonging to the BFD RS set configured through higher layer signaling does not correspond to an RS referenced in the activated TCI state of the CORESET configured for PDCCH monitoring of the terminal, the specific RS is not used by the terminal to detect a beam failure. As a result, when there is a mismatch between the BFD RS set configured through higher layer signaling and the RSS referenced in the activated TCI state of the CORESET configured for PDCCH monitoring of the terminal, stable beam failure detection of the terminal is not expected, which may result in degradation of downlink reception performance. For example, because the base station can configure a BFD RS set to the terminal through RRC signaling while activating a TCI state of the CORESET through MAC CE signaling, a mismatch may occur between the two due to a difference in delay time according to the signaling schemes. To solve the above-mentioned problems, a scheme for selecting some of RSs referenced in an activated TCI state of the CORESET(s) configured for PDCCH monitoring of the terminal may be indicated to the terminal, so that the base station may recognize information on the BFD RS set selected by the terminal. Thereby, it is possible to increase the understanding of the base station for a BFR request signal from the terminal. Or, it is possible to perform the BFR procedure with a low delay time by increasing the efficiency of the BFD process for determining whether smooth downlink transmission between the base station and the terminal is possible. Or, it is possible to perform the BFD process for effectively identifying a beam failure between the base station and the terminal by instructing to include a suitable RS in the BFD RS set. Such an issue can be equally applied to the candidate beam RS set used in the new candidate beam identification process.

In addition, as the BFR procedure of the current NR system is designed without considering an operation like the multi-TRP/panel operation of the base station, in the case of the multi-TRP/panel operation of the base station, the BFR procedure can be efficiently performed if individual links between the multi-TRPs/panels of the base station and the terminal are used, rather than following the existing BFR procedure. For example, among multi-TRPs/panels connected to the terminal, if a link between the terminal and a TRP or panel that does not undergo a beam failure is used, BFR for the link between the TRP or panel experiencing a beam failure and the terminal can be achieved in a low delay time. Simplification of the BFR procedure in consideration of multiple links of the multi-TRPs/panels in embodiments of the disclosure is not limited to multi-TRPs/panels, and can be equally applied to a single-TRP/panel situation in an environment where plural BFD RS sets are defined and BFR is performed for each BFD RS set.

Next, embodiments of the disclosure will be described in detail with reference to the accompanying drawings. Also, in the description of the disclosure, descriptions of related functions and structures incorporated herein may be omitted to avoid obscuring the subject matter of the disclosure. Further, the terms described below are defined in consideration of their functions in the disclosure, and these may vary depending on the intention of the user, the operator, or the custom. Hence, their meanings should be determined based on the overall contents of this specification.

Hereinafter, the above examples are described through plural embodiments of the disclosure, but these are not independent and one or more embodiments may be applied simultaneously or in combination.

First embodiment: composing and providing BFD RS set and BFD RS group for partial BFR As an embodiment of the disclosure, the terminal may be configured with one or more BFD RS sets by the base station through higher layer signaling. Here, each BFD RS set may include up to two or more RSs. Further, to enable the base station and the terminal to perform partial BFR, RSs defined in the BFD RS set are grouped, and for each group, when a beam failure occurs in all RSs in the group, the physical layer of the terminal can deliver a beam failure indication to a higher layer. Here, the unit of grouped RSs may have one of various names such as BFD RS group, BFD RS detailed set, BFD RS detailed group, BFD RS subset, and BFD RS subgroup, and it will be described later as a BFD RS group. Regardless of whether there is one or more BFD RS sets, there may be one or more BFD RS groups in each BFD RS set defined to perform partial BFR. In consideration of each of the elements listed below or a combination of the elements, the RSs in each BFD RS set may be grouped and used as a criterion for prioritization in composing each BFD RS group.

RS time domain operation scheme: there may be three types of RSs including periodic, semi-persistent, and aperiodic RS. For example, a periodic RS, a semi-persistent RS, and an aperiodic RS may be assigned (or included in) to an RS group in that order, or one periodic RS may be assigned first to each RS group and then a semi-persistent RS and an aperiodic RS may be assigned.

CORESET index value: each RS can be assigned to an RS group according to the size of the index value of the CORESET configured with a TCI state referencing it. As an example, for each RS group, the RS corresponding to the lower CORESET index may be assigned first, or the RS corresponding to the higher CORESET index may be assigned first.

CORESETPoolIndex value: a CORESET may include an index such as CORESETPoolIndex that can identify the TRP from which it has been transmitted. Referring to the corresponding index, RSs referenced in TCI states configured in CORESETs having the same index can be grouped into the same group.

QCL Type: one RS set to specific QCL-Type (e.g., QCL-TypeD) in the TCI state of the CORESET may be assigned to each group, or RSs set to specific QCL-Type (e.g., QCL-TypeD) may be grouped into one group.

In the case where the terminal is not configured with a BFD RS set through higher layer signaling by the base station, the above scheme for composing and providing a BFD RS set can be applied even when the terminal configures a BFD RS set at its discretion or when the base station instructs the terminal how to configure a BFD RS set.

Figure 10:
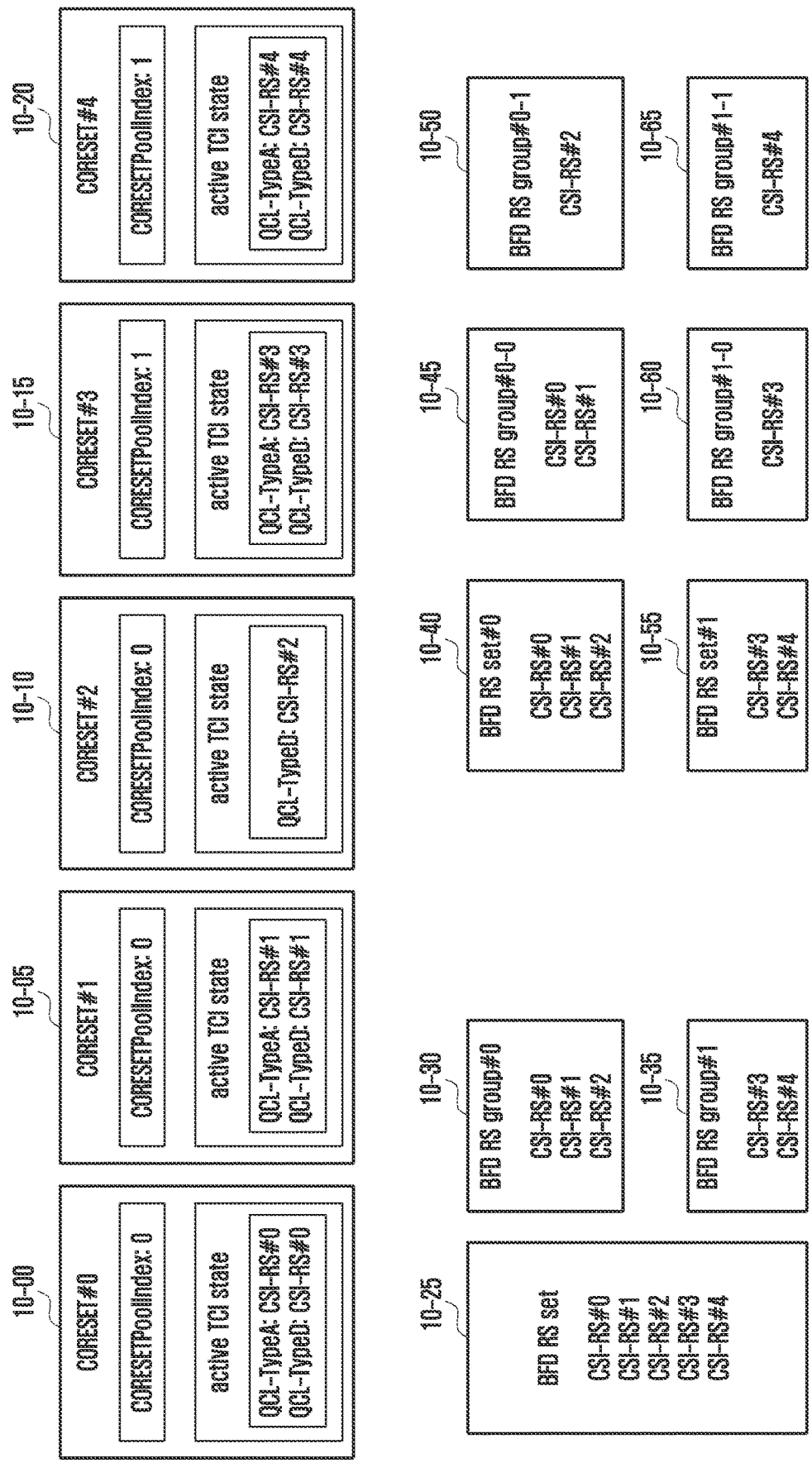
FIG. 10 is a diagram illustrating an example of configuring beam failure detection (BFD) reference signal (RS) sets and BFD RS groups for performing partial BFR according to an embodiment of the disclosure.

FIG. 10 is a diagram illustrating an example of composing BFD RS sets and BFD RS groups for performing partial BFR according to an embodiment of the disclosure.

In FIG. 10, it is assumed, for example, that five CORESETs are configured on a specific BWP between the base station and the terminal, and activated TCI state, referenced RS and QCL type are present for each CORESET as shown by indicia 10-00, 10-05, 10-10, 10-15 and 10-20. However, this is given as an example for convenience of description, and the disclosure is not limited thereto.

When the base station configures one BFD RS set 10-25 {CSI-RS #0, CSI-RS #1, CSI-RS #2, CSI-RS #3, CSI-RS #4} to the terminal, as shown in FIG. 10, two BFD RS groups may be formed in the BFD RS set as BFD RS group #0 (10-30) {CSI-RS #0, CSI-RS #1, CSI-RS #2}, and BFD RS group #1 (10-35) {CSI-RS #3, CSI-RS #4}, where the determining criterion of the BFD RS set is the same CORESETPoolIndex value. That is, among RSs belonging to the BFD RS set, RSs belonging to CORESETs having the same CORESETPoolIndex may belong to the same BFD RS group. As another example, when the base station configures the terminal with two BFD RS sets as BFD RS set #0 (10-40) {CSI-RS #0, CSI-RS #1, CSI-RS #2} and BFD RS set #1 (10-45) {CSI-RS #3, CSI-RS #4}, BFD RS set #0 can be grouped into BFD RS group #0-0 (10-45) {CSI-RS #0, CSI-RS #1} and BFD RS group #0-1 (10-50) {CSI-RS #2}, and BFD RS set #1 may be grouped into BFD RS group #1-0 (10-60) {CSI-RS #3} and BFD RS group #1-1 (10-65) {CSI-RS #4}. In this case, the criterion for dividing BFD RS group #0-0 and BFD RS group #0-1 may be QCL-Type. In FIG. 10, RSs set to QCL-TypeD are grouped first. Hence, CSI-RS #0 set as referenced RS of QCL-TypeA and QCL-TypeD in CORESET #0 (10-00), and CSI-RS #1 set as referenced RS of QCL-TypeA and QCL-TypeD in CORESET #1 (10-05) may be grouped first into BFD RS group #0-0, and remaining CSI-RS #2 may be grouped into BFD RS group #0-1. Further, the criterion for dividing BFD RS group #1-0 and BFD RS group #1-1 may be a CORESET index value. As an example, among CORESET #3 and CORESET #4 configured to have an activated TCI state referencing RSs belonging to BFD RS set #1, CSI-RS #3 set as QCL referenced RS of CORESET #3 having a lower index value may be assigned first to BFD RS group #1-0, and then CSI-RS #4 set as QCL referenced RS of CORESET #4 having a next lower index value may be assigned to BFD RS group #1-1. Besides the example depicted in FIG. 10, the criteria listed above or a combination thereof may be used by the base station that configures information on the BFD RS set or BFD RS group to the terminal via higher layer signaling, or by the terminal that composes a BFD RS set or BFD RS group when there is no configuration information about the BFD RS set or BFD RS group from the base station.

Second Embodiment: BFD Process Configuration and Method According to Partial BFR In an embodiment of the disclosure, the terminal may be configured with a BFD RS set and BFD RS group through higher layer signaling by the base station, and may be configured with information required in the BFD process according to the configured BFD RS set and BFD RS group information. The information required in the BFD process may include information such as beamFailureInstanceMaxCount indicating the maximum indication value of the beam failure indication, and beamFailureDetectionTimer indicating a value at which the beam failure detection timer is reset. For instance, as shown by indicia 10-25 to 10-35 in FIG. 10, if the terminal has been configured with one BFD RS set and two BFD RS groups, it may be configured with information such as beamFailureInstanceMaxCount and beamFailureDetectionTimer required in the BFD process for each BFD RS group. As another example, as shown by indicia 10-40 to 10-65 in FIG. 10, when the terminal has been configured with two BFD RS sets and two BFD RS groups per BFD RS set, it may be configured with information such as beamFailureInstanceMaxCount and beamFailureDetectionTimer required in the BFD process for each BFD RS group per BFD RS set, or it may be configured with the same information such as beamFailureInstanceMaxCount and beamFailureDetectionTimer required in the BFD process for all BFD RS groups in each BFD RS set. As another example, when the terminal composes a BFD RS set and BFD RS group as it has not been configured with a BFD RS set and BFD RS group through higher layer signaling by the base station, the base station may configure information required in the BFD process through higher layer signaling for each BFD RS group per BFD RS set.

Figure 11:
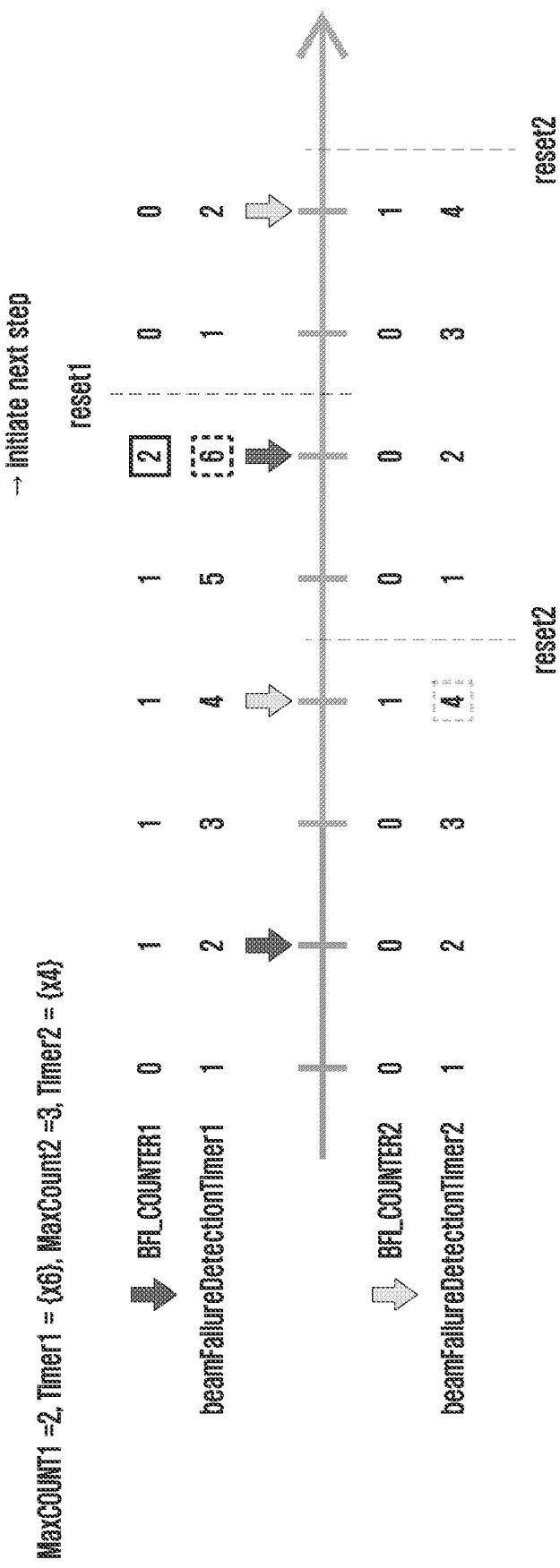
FIG. 11 is a diagram illustrating an example where plural pieces of information required in the BFD process, such as beamFailureInstanceMaxCount and beamFailureDetectionTimer, are configured according to an embodiment of the disclosure.

FIG. 11 is a diagram illustrating an example where plural pieces of information required in the BFD process, such as beamFailureInstanceMaxCount and beamFailureDetectionTimer, are configured according to an embodiment of the disclosure.

In FIG. 11, MaxCount1 and MaxCount2 mean different instances of beamFailureInstanceMaxCount, and have values of 2 and 3, respectively. In addition, Timer1 and Timer2 mean different instances of beamFailureDetectionTimer, and have values of 6 and 4, respectively. Each configuration information in FIG. 11 may be applied when information required in the BFD process, such as beamFailureInstanceMaxCount and beamFailureDetectionTimer, is configured for two BFD RS groups in a single BFD RS set, for two BFD RS sets without a BFD RS group, or for each of two BFD RS sets each having two or more BFD RS groups.

In FIG. 11, beamFailureDetectionTimer1 is incremented by 1 every beam failure indication periodicity and is reset when reaching 6, and beamFailureDetectionTimer2 is incremented by 1 every beam failure indication periodicity and is reset when reaching 4. BFI_COUNTER1 is a counter that is incremented when a beam failure indication occurs in the BFD process in which MaxCount1 and beamFailureDetectionTimer1 are configured, where when a beam failure occurs for all BFD RSs belonging to the corresponding group or set according to which group or set is applied as described above, the corresponding BFD procedure regards this as a beam failure indication. BFI_COUNTER2 is a counter that is incremented when a beam failure indication occurs in the BFD process in which MaxCount2 and beamFailureDetectionTimer2 are configured, where the same description as for BFI_COUNTER1 may be applied to the corresponding BFD process. BFI_COUNTER1 and BFI_ COUNTER2 are reset when beamFailureDetectionTimer1 and beamFailureDetectionTimer2 respectively reach their maximum values. In FIG. 11, it can be seen that the beam failure indication corresponding to BFI_COUNTER1 occurs when beamFailureDetectionTimer1 is 2 and 6, and BFI_ COUNTER1 increases by 1 at each beam failure indication. At this time, as the value of MaxCount1 is 2, as shown in FIG. 11, when BFI_COUNTER1 reaches MaxCount, the next step of BFR is initiated. Further, it can be seen that the beam failure indication corresponding to BFI_COUNTER2 occurs when beamFailureDetection Timer2 is 4, and BFI_ COUNTER2 increases by 1 at occurrence of this beam failure indication. However, since BFI_ COUNTER2 did not reach MaxCount2 until beamFailureDetectionTimer2 reaches 4, beamFailureDetectionTimer2 is reset to 1 after 4, and BFI_COUNTER2 is also reset to 0 at this time. Thereafter, when beamFailureDetectionTimer2 is 4, a beam failure indication occurs and BFI_COUNTER2 increases by 1, but as beamFailureDetectionTimer2 has already reached 4, beamFailureDetectionTimer2 is reset to 1 again at the next periodicity and BFI_COUNTER2 is also reset to 0. On the other hand, the above-described example is provided only for the convenience of description of an embodiment of the disclosure, and the disclosure is not limited thereto.

Third embodiment: new candidate beam indication process configuration and method according to partial BFR In an embodiment of the disclosure, the terminal may perform a process of replacing a beam with a new beam to overcome a beam failure occurring in the BFR process. A method of indicating a new candidate beam determined in this process may be defined as new candidate beam indication. The terminal may be configured with one or plural candidateBeamRSLists through higher layer signaling by the base station. One or plural candidateBeamRSLists correspond respectively to the BFD RS set or plural BFD RS groups in the BFD RS set, and are defined as a list of new candidate beams to become a replacement due to beam failure. To derive a new candidate beam for each BFD RS set or BFD RS group connected to one or plural configured candidateBeamRSLists, the terminal measures L1-RSRP for new candidate beams in candidateBeamRSList and compares it with a reference value. Here, as the reference value, separate values or the same value may be set for one or plural candidateBeamRSLists. A higher layer of the terminal selects one of the new candidate beams having L1-RSRP higher than the reference value (threshold) and delivers it to the physical layer of the terminal, and the physical layer of the terminal delivers information on the new candidate beam to the base station through a physical uplink channel connected to the received new candidate beam.

For example, candidateBeamRSList may include a plurality of new candidate beams; each new candidate beam may have an SSB index or a CSI-RS resource index; and one of PRACH, SRS, and PUCCH resources is included as a physical uplink channel connected to the corresponding new candidate beam. One new candidate beam may be connected (or, associated) with one physical uplink channel. As another example, candidateBeamRSList may include a plurality of physical uplink channels, and each physical uplink channel may be associated with an SSB index or CSI-RS resource index indicating a new candidate beam. Here, candidateBeamRSList may include physical uplink channels of only one type among PRACH, SRS, and PUCCH, or may include physical uplink channels of two or more types. In this case as well, one physical uplink channel may be connected to one new candidate beam.

Figure 12:
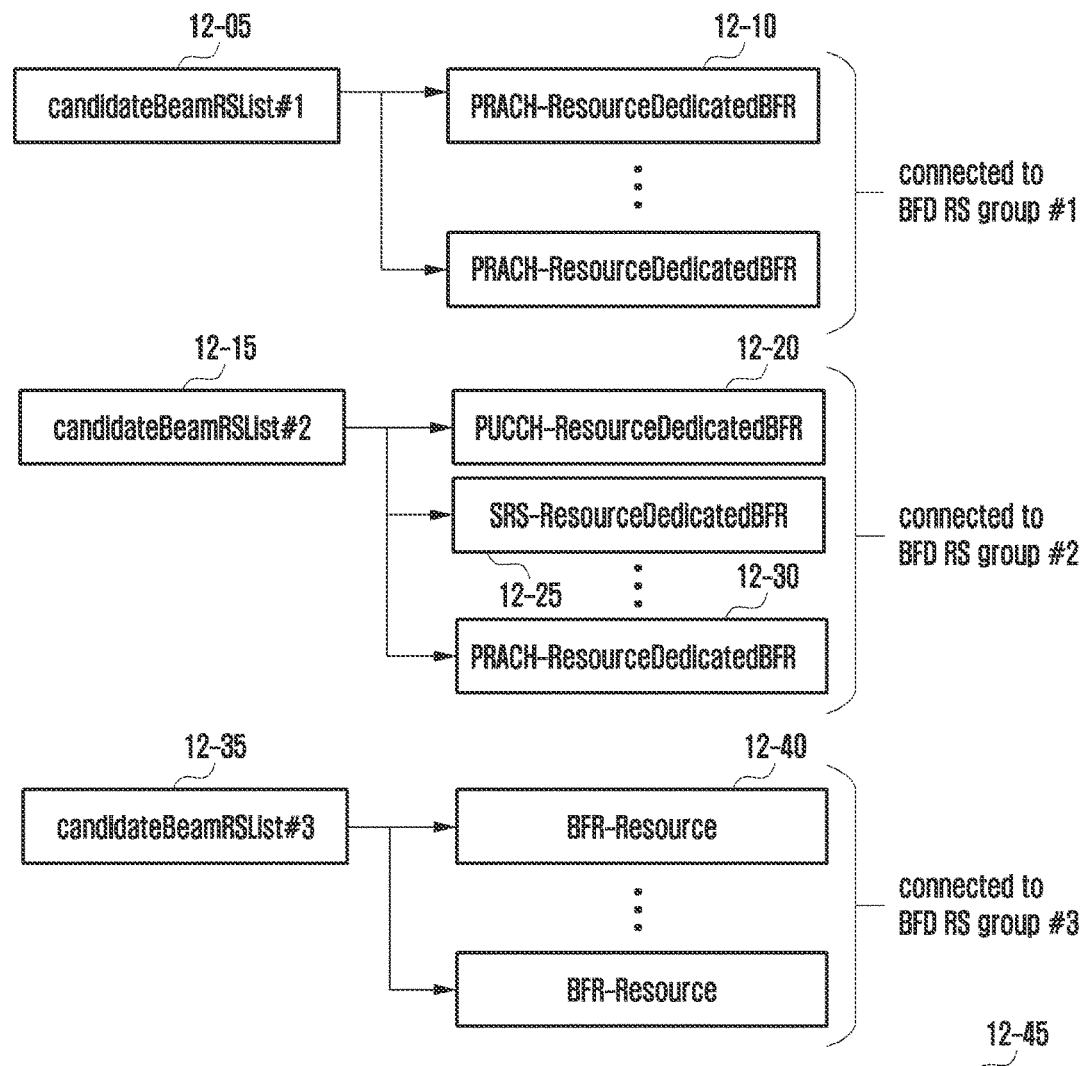
FIG. 12 is a diagram illustrating a plurality of candidateBeamRSList separately defined (or configured) according to an embodiment of the disclosure.

FIG. 12 is a diagram illustrating a plurality of candidateBeamRSList separately defined (or configured) according to an embodiment of the disclosure.

FIG. 12 is a diagram illustrating three candidateBeamRSLists 12-05, 12-15 and 12-35 defined (or configured) according to an embodiment of the disclosure. candidateBeamRSList #1 (12-05) is composed of plural PRACH resources 12-10, and each PRACH resource may have a connected new candidate beam. Here, when a new candidate beam is determined, a PRACH of one type is used as a physical uplink channel for the terminal. candidateBeamRSList #2 (12-15) is composed of plural PRACH resources 12-30, SRS resources 12-25, and PUCCH resources 12-20, and each PRACH, SRS and PUCCH resource can have a connected new candidate beam. Here, when a new candidate beam is determined, the physical uplink channel used by the terminal is PRACH, SRS, and PUCCH resources of three types. When a new candidate beam is determined, PRACH, SRS and PUCCH resources of three types are used as a physical uplink channel for the terminal. candidateBeamRSList #3 (12-35) is composed of plural new candidate beams 12-40, and each new candidate beam may include information as shown by indicia 12-45. For instance, it may have an SSB index as a specific new candidate beam, and may have an SRS resource as a connected physical uplink channel. candidateBeamRSList #1, #2, #3 are connected respectively to BFD RS group #1, #2, #3; and when a beam failure occurs in a specific BFD RS group, a new candidate beam can be determined from the connected candidateBeamRSList and used in the subsequent BFR process.

Fourth Embodiment: BFRQ and Base Station Response Process Configuration and Method According to Partial BFR In one embodiment of the disclosure, the terminal may perform the BFD process for plural BFD RS sets or groups; and when the maximum value of the beam failure indication is reached as described above for one of the plural BFD RS sets or groups, the terminal may notify the base station of a beam failure situation and perform a beam failure recovery request (BFRQ) process for requesting beam failure recovery by delivering a determined new candidate beam to the base station. The terminal may determine a new candidate beam in candidateBeamRSList connected to the BFD RS set or group that has reached the maximum value of the beam failure indication, and perform BFRQ by using a physical uplink channel connected to the determined new candidate beam. The subsequent base station response process may be varied depending on which physical uplink channel is used by the terminal.

Figure 13:
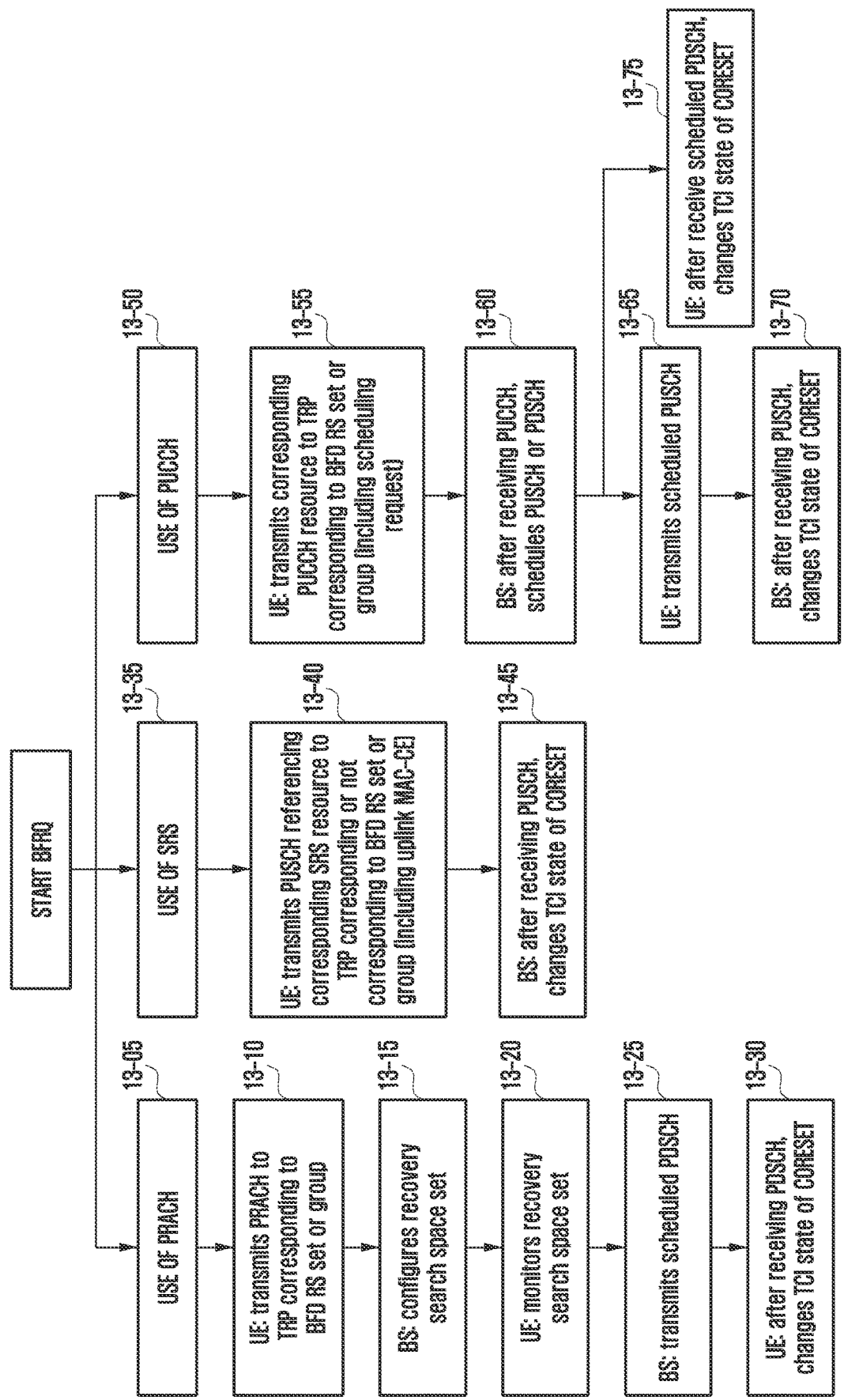
FIG. 13 is a diagram illustrating a configuration and method for a beam failure recovery request (BFRQ) of a terminal and a response process of a base station according to an embodiment of the disclosure.

FIG. 13 is a diagram illustrating a configuration and method for a BFRQ of the terminal and a response process of the base station according to an embodiment of the disclosure.

For instance, if the physical uplink channel connected to the determined new candidate beam is PRACH (13-05) and the new candidate beam includes a SSB index, the terminal performs PRACH transmission at a RACH occasion associated with the corresponding SSB by using a preamble index configured for PRACH transmission. If the physical uplink channel connected to the determined new candidate beam is PRACH and the new candidate beam includes a CSI-RS resource index, the terminal performs PRACH transmission at the corresponding RACH occasion by using the preamble index and RACH occasion information configured for PRACH transmission. Here, if the BFD RS set or group corresponds to a TRP, that is, if the BFD RS set or group is determined based on CORESETPoolIndex, the terminal transmits the PRACH toward the TRP corresponding to the CORESETPoolIndex of the BFD RS set or group (13-10). That is, the PRACH is transmitted to the TRP in which a beam failure has occurred. Meanwhile, as described above, when candidateBeamRSList to which the new candidate beam belongs corresponds to (or is associated with) a specific BFD RS set or BFD RS group and the corresponding BFD RS set or BFD RS group corresponds to, for example, a CORESETPoolIndex value of 0, it can be said that the new candidate beam also corresponds to the CORESETPoolIndex value of 0. Hence, transmitting the PRACH to the TRP where the beam failure has occurred may mean transmitting, for example, if the CORESETPoolIndex value corresponding to the BFD RS set or BFD RS group in which a beam failure has occurred is 0, the PRACH connected to the new candidate beam corresponding to the CORESETPoolIndex value of 0. In this case, it can be said that the transmitted PRACH also corresponds to the CORESETPoolIndex value of 0. After PRACH transmission, the base station configures a recovery search space set (13-15), and the terminal monitors the PDCCH in the recovery search space set (13-20) to receive scheduling of a PDSCH including a MAC-CE that changes the TCI state of the CORESET in which a beam failure has occurred (13-25). In receiving the corresponding PDCCH or PDSCH, the terminal may assume that the PDCCH and the PDSCH are QCLed with the determined new candidate beam. The terminal receives the PDSCH and changes the TCI state of the CORESET by using the TCI state activation MAC-CE in the PDSCH (13-30).

As another example, if the physical uplink channel connected to the determined new candidate beam is a SRS (13-35), the terminal may perform BFRQ through PUSCH transmission referencing the corresponding SRS resource. In this case, the terminal may transmit a MAC-CE activation signal for a CORESET whose RS referenced in the TCI state is to be changed by including information on the new candidate beam and the BFD RS set and group in PUSCH transmission. Further, if the BFD RS set or group corresponds to each TRP, that is, if the BFD RS set or group is determined based on CORESETPoolIndex, the terminal may transmit a scheduled PUSCH for the remaining TRPs except for the TRP corresponding to CORESETPoolIndex of the BFD RS set or group (13-40). That is, a scheduled PUSCH may be transmitted for a TRP (e.g., TRP in which no beam failure has occurred) other than the TRP in which a beam failure has occurred. Meanwhile, as described above, if candidateBeamRSList to which the new candidate beam belongs corresponds (or is connected) to a specific BFD RS set or BFD RS group, and the corresponding BFD RS set or BFD RS group corresponds to, for example, a CORESETPoolIndex value of 0, it can be said that the new candidate beam also corresponds to the CORESETPoolIndex value of 0. Hence, transmitting a scheduled PUSCH for a TRP other than the TRP in which the beam failure occurs may mean transmitting, for example, if the CORESETPoolindex value corresponding to the BFD RS set or BFD RS group in which a beam failure has occurred is 0, a PUSCH connected to the new candidate beam corresponding to the CORESETPoolIndex value of 1. In this case, it can be said that the transmitted PUSCH also corresponds to the CORESETPoolIndex value of 1. Accordingly, BFR between a TRP in which a beam failure has occurred and the terminal may be performed through a TRP in which a beam failure does not occur. On the other hand, the terminal may transmit the scheduled PUSCH also for a TRP corresponding to CORESETPoolIndex of the BFD RS set or group (13-40). That is, a scheduled PUSCH may be transmitted for a TRP in which a beam failure has occurred. Meanwhile, as described above, if candidateBeamRSList to which the new candidate beam belongs corresponds (or, is connected) to a specific BFD RS set or BFD RS group, and the corresponding BFD RS set or BFD RS group corresponds to, for example, a CORESETPoolIndex value of 0, it can be said that the new candidate beam also corresponds to the CORESETPoolIndex value of 0. Hence, transmitting a scheduled PUSCH for a TRP in which a beam failure has occurred may mean transmitting, for example, if the BFD RS set or BFD RS group where a beam failure has occurred corresponds to the CORESETPoolIndex value of 0, a PUSCH connected to the new candidate beam corresponding to the CORESETPoolIndex value of 0. In this case, it can be said that the transmitted PUSCH also corresponds to the CORESETPoolIndex value of 0.

After receiving the PUSCH transmission from the terminal, the base station may change the RS of the TCI state of the CORESET to be changed to a new candidate beam based on information included in the PUSCH (13-45).

As another example, if the physical uplink channel connected to the determined new candidate beam is a PUCCH (13-50), the terminal may perform BFRQ through PUCCH transmission by using a corresponding PUCCH resource. Here, the terminal may include scheduling request information in the PUCCH transmission, and the corresponding scheduling request may be a scheduling request for PUSCH or PDSCH transmission (13-55). In this case, the PUCCH format used by the terminal for PUCCH transmission may be 0 or 1. Further, the above scheduling request configuration may be separately set for a BFR purpose, and the scheduling request configuration for the corresponding BFR purpose may have a higher priority compared to the scheduling request configuration for a non-BFR purpose. Further, if the BFD RS set or group corresponds to each TRP, that is, if the BFD RS set or group is determined based on CORESETPoolIndex, the terminal may transmit a scheduled PUCCH for the remaining TRPs except for the TRP corresponding to CORESETPoolIndex of the BFD RS set or group. That is, a scheduled PUCCH may be transmitted for a TRP (e.g., TRP in which no beam failure has occurred) other than the TRP in which a beam failure has occurred. Meanwhile, as described above, if candidateBeamRSList to which the new candidate beam belongs corresponds (or is connected) to a specific BFD RS set or BFD RS group, and the corresponding BFD RS set or BFD RS group corresponds to, for example, a CORESETPoolIndex value of 0, it can be said that the new candidate beam also corresponds to the CORESETPoolIndex value of 0. Hence, transmitting a scheduled PUCCH for a TRP other than the TRP in which a beam failure has occurred may mean transmitting, for example, if the CORESETPoolindex value corresponding to the BFD RS set or BFD RS group in which a beam failure has occurred is 0, a PUCCH connected to the new candidate beam corresponding to the CORESETPoolIndex value of 1. In this case, it can be said that the transmitted PUCCH also corresponds to the CORESETPoolIndex value of 1. Accordingly, BFR between a TRP in which a beam failure has occurred and the terminal may be performed through a TRP in which a beam failure does not occur. Further, the terminal may perform PUCCH transmission also for a TRP corresponding to CORESETPoolIndex of the BFD RS set or group. That is, a scheduled PUCCH may be transmitted for a TRP in which a beam failure has occurred. Meanwhile, as described above, if candidateBeamRSList to which the new candidate beam belongs corresponds (or, is connected) to a specific BFD RS set or BFD RS group, and the corresponding BFD RS set or BFD RS group corresponds to, for example, a CORESETPoolIndex value of 0, it can be said that the new candidate beam also corresponds to the CORESETPoolIndex value of 0. Hence, transmitting a scheduled PUCCH for a TRP in which a beam failure has occurred may mean transmitting, for example, if the BFD RS set or BFD RS group where a beam failure has occurred corresponds to the CORESETPoolIndex value of 0, a PUCCH connected to the new candidate beam corresponding to the CORESETPoolIndex value of 0. In this case, it can be said that the transmitted PUCCH also corresponds to the CORESETPoolIndex value of 0.

Upon receiving the PUCCH transmission from the terminal, if a PUSCH scheduling request (13-60), the base station transmits the corresponding DCI to schedule a PUSCH including a MAC-CE that activates a change of the TCI state of a CORESET (13-65), so that the terminal is enabled to change the RS of the TCI state of the CORESET to be changed by using the new candidate beam (13-70). Alternatively, upon receiving the PUCCH transmission from the terminal, if a PDSCH scheduling request (13-60), the base station transmits the corresponding DCI to schedule a PDSCH including a MAC-CE that activates a change of the TCI state of a CORESET, so that the terminal is enabled to change the RS of the TCI state of the CORESET to be changed by using the new candidate beam (13-75).

Meanwhile, the terminal may include a MAC-CE for partial BFR in the PUSCH. The MAC-CE may include, for example, at least one piece of the following information.

Index(es) of TRPs whose radio link quality is lower than a given threshold for all RSs in the BFD RS set or BFD RS group corresponding to each TRP (or, RSs in the BFD RS set or BFD RS group corresponding to each CORESETPoolIndex): for example, may be index(es) of the BFD RS sets, or CORESETPoolIndex(es).

The presence or absence of a new candidate beam corresponding to the TRP index(es) (or CORESETPoolIndex)

If there is a new candidate beam corresponding to the TRP (or CORESETPoolIndex), the index(es) of the new candidate beam The terminal may receive, from the base station, a DCI using the same hybrid automatic repeat request (HARQ) process ID as the DCI having scheduled the PUSCH transmission including the MAC-CE, may be scheduled with a new PUSCH transmission, and may perform, after X symbols (e.g., X is a value related to a change of the downlink reception beam of the terminal, and may have one of 7, 14 and 28), CORESET reception operation with reference to TRP index(es) (or, BFD RS set index(es), CORESETPoolIndex(es)) in the MAC-CE. For example, if a TRP index having a CORESETPoolIndex value of 0 is included in the MAC-CE, the terminal may assume that all CORESETs whose CORESETPoolIndex is set to 0 and the new candidate beam included in the MAC-CE have a QCL relationship with each other; and may perform CORESET reception operation correspondingly. As another example, if a TRP index having a CORESETPoolIndex value of 1 is included in the MAC-CE, the terminal may assume that all CORESETs whose CORESETPoolIndex is set to 1 and the new candidate beam included in the MAC-CE have a QCL relationship with each other, and may perform CORESET reception operation correspondingly.

Fifth Embodiment: BFD RS Set/Group or Candidate Beam Set Configuration Change

In one embodiment of the disclosure, the base station and the terminal may exchange signaling for adding/changing/deleting a BFD RS to/in/from a BFD RS set or group, for adding/changing/deleting a new candidate beam to/in/from a candidate beam set, or for adding/changing/deleting a connected physical uplink channel. As an example, when the base station has configured a BFD RS set or group to the terminal through higher layer signaling, if the number of times that the hypothetical PDCCH reception BLER calculated for a specific BFD RS in the configured BFD RS set or group exceeds a reference value becomes greater than a specific number of times, the terminal may request the base station to change the specific BFD RS. Here, as a request method from the terminal to the base station, an explicit scheme such as a PUCCH-based scheduling request method or PUSCH-based MAC-CE activation may be used. the PUCCH-based scheduling request scheme may be performed in a manner where the terminal requests PDSCH scheduling to the base station and performs activation of a new BFD RS through downlink MAC-CE reception from the base station or in a manner where the terminal requests PUSCH scheduling to the base station and transmits a PUSCH including a MAC-CE indicating activation of a new BFD RS. PUSCH-based MAC-CE activation is a method in which the terminal transmits information on the BFD RS to be changed to the base station by including it in an uplink MAC-CE of the PUSCH payload. When performing the PUCCH-based scheduling request method or PUSCH-based MAC-CE activation, at least information on the BFD RS to be added/changed/deleted and information about the BFD RS group or set including the BFD RS to be added/changed/deleted may be included when the terminal transmits to the base station. As another example, for both cases where the base station configures or does not configure a BFD RS set or group to the terminal through higher layer signaling, when the base station changes a TCI state of a CORESET, if the RS in the TCI state before change is included in the BFD RS set or group, the RS in the changed TCI state is added to the BFD RS set or group, and the RS in the TCI state before change is deleted from the BFD RS set or group. Here, the RS set as QCL-TypeD among RSs in the changed TCI state is configured first. The same scheme as addition/change/deletion of a BFD RS for the BFD RS set or group may be applied to addition/change/deletion of a new candidate beam for the candidate beam set or addition/change/deletion of a connected physical uplink channel.

Figure 14:
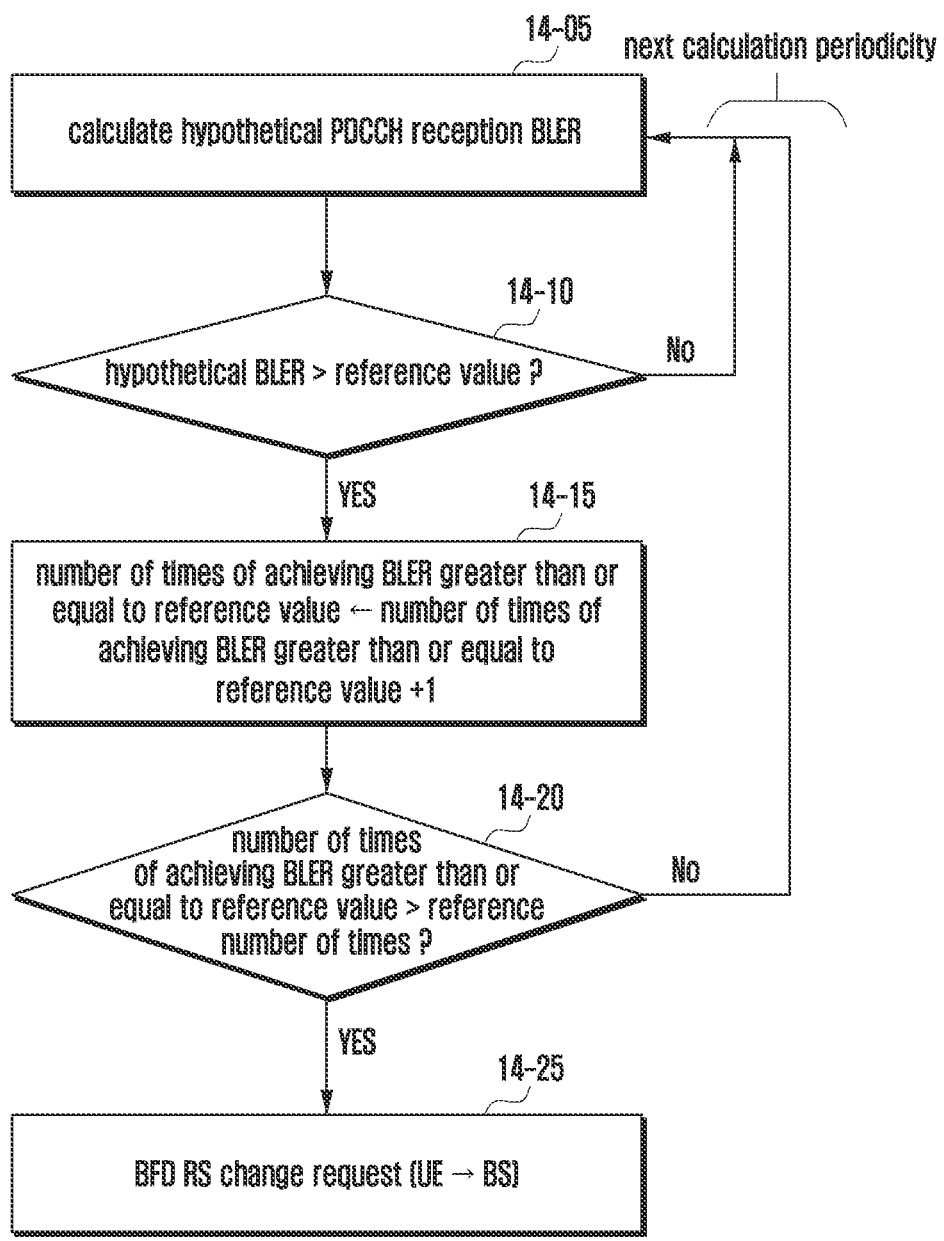
FIG. 14 is a diagram illustrating a BFD RS change procedure according to an embodiment of the disclosure.

FIG. 14 is a diagram illustrating a BFD RS change procedure according to an embodiment of the disclosure.

The terminal calculates a hypothetical PDCCH reception BLER for a specific BFD RS in the BFD RS set or group (14-05), compares the calculated hypothetical BLER value with a reference BLER value (14-10), and calculates, if not greater than the reference BLER value, the hypothetical PDCCH reception BLER again at the next hypothetical BLER calculation periodicity. If the hypothetical BLER is greater than the reference BLER value, the terminal increases the number of times of achieving a BLER greater than or equal to the reference value by one (14-15). The terminal compares the number of times of achieving a BLER greater than or equal to the reference value with a reference number of times (14-20), and calculates, if not greater than the reference number of times, the hypothetical PDCCH reception BLER again at the next hypothetical BLER calculation periodicity. If greater than the reference number of times, the terminal may perform a change request for the corresponding BFD RS to the base station (14-25). Here, as the request method of the terminal, an explicit method such as the PUCCH-based scheduling request method or the PUSCH-based MAC-CE activation may be used as described above.

Sixth Embodiment: Partial BFR Operation Per TRP Group

In an embodiment of the disclosure, for the above partial BFR operation, the terminal may perform partial BFR for each TRP group in which several TRPs are bundled, rather than performing partial BFR for each TRP. Here, the TRP group refers to a case in which BFD RSs corresponding to multiple TRPs belong to one BFD RS set or belong to a BFD RS group defined in the BFD RS set.

For example, a case where BFD RS #1 and BFD RS #2 are present in one BFD RS set, and BFD RS #1 corresponds to TRP #1 and BFD RS #2 corresponds to TRP #2 can be considered. Here, the correspondence between BFD RS and TRP may be a case where the BFD RS exists as an RS referenced in the TCI state of the CORESET transmitted by the TRP, in which case the CORESET may be configured with a specific CORESETPoolIndex value. Further, the correspondence between BFD RS and TRP may also be a case where the QCL assumption of a specific CORESET has plural TCI states, and the BFD RS exists as an RS referenced in one of the plural TCI states. For example, the terminal may be configured with BFD RS set 1, composed of RSs referenced in the TCI states of CORESETs whose CORESETPoolIndex values are 0 and 1, and BFD RS set 2, composed of RSs referenced in the TCI states of CORESETs whose CORESETPoolIndex values are 2 and 3, through higher layer signaling, or may at its discretion configure them if they are not configured through higher layer signaling.

In this case, the terminal may perform partial BFR operation for BFD RS sets 1 and 2, respectively. The terminal calculates hypothetical PDCCH BLER values for all BFD RSs in BFD RS set 1, and if all the hypothetical PDCCH BLER values are smaller than the reference value, BFD may be indicated by the physical layer of the terminal to a higher layer. The BFD process for partial BFR operation per TRP group may be performed similarly to the second embodiment described above.

Similar to the third embodiment, the terminal may perform a process of replacing a beam with a new beam to overcome beam failure in partial BFR operation per TRP group. A method of indicating a new candidate beam determined in this process may be defined as new candidate beam indication. The terminal may be configured with one or plural candidateBeamRSLists through higher layer signaling by the base station. One or plural candidateBeamRSLists correspond respectively to the BFD RS set or plural BFD RS groups in the BFD RS set, and are defined as a list of new candidate beams to become a replacement due to beam failure. Similar to the BFD RS set or group for partial BFR operation per TRP group, for each candidateBeamRSList, there can be new candidate beams corresponding to TRPs connected to the BFD RSs included in the corresponding BFD RS set or BFD RS group.

For instance, as in the example above, when the terminal is configured with BFD RS set 1, composed of RSs referenced in the TCI states of CORESETs whose CORESETPoolIndex values are 0 and 1, and BFD RS set 2, composed of RSs referenced in the TCI states of CORESETs whose CORESETPoolIndex values are 2 and 3, through higher layer signaling by the base station, or when the terminal configures them at its discretion if no such configuration, candidateBeamRSList #1 corresponding to BFD RS set 1 may include new candidate beams connected respectively to TRPs that transmit CORESETs having CORESETooIIndex values of 0 and 1, and candidateBeamRSList #2 corresponding to BFD RS set 2 may include new candidate beams connected respectively to TRPs that transmit CORESETs having CORESETooIIndex values of 2 and 3.

The terminal measures L1-RSRPs for new candidate beams in candidateBeamRSList and compares them with a reference value, and a higher layer of the terminal selects some of the new candidate beams having L1-RSRP higher than the reference value and delivers them to the physical layer of the terminal. Here, the higher layer of the terminal may select one of the new candidate beams in order to change a beam for one TRP among all TRPs connected to the new candidate beams in candidateBeamRSList, or may select at least one new candidate beam for all connected TRPs among the new candidate beams having L1-RSRP greater than the reference value in order to change beams for all TRPs connected to new candidate beams in candidateBeamRSList. For example, when there are 4 new candidate beams in candidateBeamRSList, new candidate beams #1 and #2 correspond to TRP #1 and new candidate beams #3 and #4 correspond to TRP #2, and new candidate beams #1, #3 and #4 have L1-RSRP greater than the reference value among them, the terminal may select only new candidate beam #1 at its discretion among the three or may select new candidate beams #1 and #3 in order to select at least one new candidate beam corresponding respectively to TRP #1 and TRP #2. The new candidate beams selected at the upper layer of the terminal are delivered to the physical layer, and the terminal transmits information about the new candidate beams to the base station through a physical uplink channel connected to the delivered new candidate beams.

Similarly to the fourth embodiment, when the maximum value of the beam failure indication is reached as described above for one of plural BFD RS sets or groups, the terminal notifies the base station of a beam failure situation and perform a beam failure recovery request (BFRQ) process for requesting beam failure recovery by delivering the determined new candidate beam to the base station. The terminal may determine a new candidate beam in candidateBeamRSList connected to the BFD RS set or group that has reached the maximum value of the beam failure indication, and perform BFRQ by using a physical uplink channel connected to the determined new candidate beam. Depending on which physical uplink channel the terminal uses, the subsequent base station response process may be varied.

If there is one selected new candidate beam, the terminal and the base station may operate similarly to the fourth embodiment for the BFRQ process. If there are plural selected new candidate beams, a BFRQ process similar to the fourth embodiment but considering plural beams to be changed is performed. For example, if the physical uplink channel connected to the determined new candidate beam is PRACH, and the new candidate beam includes an SSB index, the terminal performs PRACH transmission at a RACH occasion associated with the corresponding SSB by using a preamble index configured for PRACH transmission.

If the physical uplink channel connected to the determined new candidate beam is PRACH and the new candidate beam includes a CSI-RS resource index, the UE uses a preamble index and RACH occasion information configured for PRACH transmission to perform PRACH transmission at the corresponding RACH occasion. Here, in the case of contention-free random access-based BFR, RACH occasions corresponding respectively to plural new candidate beams are not expected to be the same. That is, in the case of contention-free random access-based BFR, RACH occasions corresponding respectively to plural new candidate beams may be characterized in that they are not the same (do not overlap).

In addition, the terminal transmits the PRACH toward the TRP corresponding to CORESETPoolIndex associated with each new candidate beam. That is, the terminal transmits the PRACH for a TRP in which a beam failure has occurred. After PRACH transmission, the base station configures a recovery search space set, and the terminal monitors PDCCHs in the recovery search space set to be scheduled with a PDSCH including a MAC-CE that changes the TCI state of a CORESET in which a beam failure has occurred. In this case, the base station may configure one recovery search space set to the terminal, and the terminal may assume that plural PDCCHs monitored in the corresponding recovery search space set are QCLed with plural new candidate beams. For example, when new candidate beam #1 and new candidate beam #2 are selected and one recovery search space set is configured, the terminal may assume, for the PDCCHs monitored in the recovery search space set, that the first PDCCH is QCLed with new candidate beam #1 and the second PDCCH is QCLed with new candidate beam #2 in transmission order.

As another example, the base station may configure plural recovery search space sets to the terminal, and the recovery search space sets may be connected respectively to new candidate beams through higher layer signaling. For instance, it can be assumed that the PDCCH monitored in recovery search space #1 is QCLed with new candidate beam #1, and the PDCCH monitored in recovery search space #2 is QCLed with new candidate beam #2. Further, it can also be assumed that the PDSCH scheduled by a PDCCH has the same QCL relationship as the new candidate beam in the QCL relationship with the PDCCH. The terminal having monitored a PDCCH in the recovery search space set receives a PDSCH scheduled by the corresponding PDCCH and changes the TCI state of a CORESET by using a TCI state activation MAC-CE in the PDSCH.

As another example, if the physical uplink channel connected to the determined new candidate beam is a SRS (13-35), the terminal may perform BFRQ through PUSCH transmission referencing the corresponding SRS resource. In this case, the terminal may transmit a MAC-CE activation signal for a CORESET whose RS referenced in the TCI state is to be changed by including information on the new candidate beam and the BFD RS set and group in PUSCH transmission. Further, if the BFD RS set or group corresponds to each TRP, that is, if the BFD RS set or group is determined based on CORESETPoolIndex, the terminal may transmit a scheduled PUSCH for the remaining TRPs except for the TRP corresponding to CORESETPoolIndex of the BFD RS set or group (13-40).

In addition, if the BFD RS set or group corresponds to plural TRPs, that is, if the BFD RS set or group is determined based on plural CORESETPoolIndexes, the terminal may transmit a scheduled PUSCH for the remaining TRPs except for the TRP corresponding to all CORESETPoolIndexes of the BFD RS set or group. That is, BFR between a TRP in which a beam failure has occurred and the terminal may be performed through a TRP in which a beam failure does not occur. In addition, the terminal may transmit the scheduled PUSCH also for a TRP corresponding to one or multiple CORESETPoolIndexes of the BFD RS set or group (13-40). After receiving the PUSCH transmission from the terminal, the base station may change the RS of the TCI state of the CORESET to be changed to a new candidate beam based on information included in the PUSCH (13-45).

As another example, if the physical uplink channel connected to the determined new candidate beam is a PUCCH (13-50), the terminal may perform BFRQ through PUCCH transmission by using a corresponding PUCCH resource. Here, the terminal may include scheduling request information in the PUCCH transmission, and the corresponding scheduling request may be a scheduling request for PUSCH or PDSCH transmission (13-55). Further, if the BFD RS set or group corresponds to each TRP, that is, if the BFD RS set or group is determined based on CORESETPoolIndex, the terminal may transmit a scheduled PUCCH for the remaining TRPs except for the TRP corresponding to CORESETPoolIndex of the BFD RS set or group.

In addition, if the BFD RS set or group corresponds to plural TRPs, that is, if the BFD RS set or group is determined based on plural CORESETPoolIndexes, the terminal may transmit a scheduled PUCCH for the remaining TRPs except for the TRP corresponding to all CORESETPoolIndexes of the BFD RS set or group. That is, BFR between a TRP in which a beam failure has occurred and the terminal may be performed through a TRP in which a beam failure does not occur. In addition, the terminal may transmit the scheduled PUCCH also for a TRP corresponding to one or multiple CORESETPoolIndexes of the BFD RS set or group.

Upon receiving the PUCCH transmission from the terminal, if a PDSCH scheduling request (13-60), the base station transmits the corresponding DCI to schedule a PDSCH including a MAC-CE that activates a change of the TCI state of a CORESET (13-65), so that the terminal is enabled to change the RS of the TCI state of the CORESET to be changed by using the new candidate beam (13-70). Upon receiving the PUCCH transmission from the terminal, if a PDSCH scheduling request (13-60), the base station transmits the corresponding DCI to schedule a PDSCH including a MAC-CE that activates a change of the TCI state of a CORESET, so that the terminal is enabled to change the RS of the TCI state of the CORESET to be changed by using the new candidate beam (13-70).

The terminal may report to the base station that it can perform partial BFR operation as a UE capability. For example, the terminal may report that partial BFR operation is possible through UE capability reporting. As another example, through a UE capability report, the terminal may report the number of BFD RS sets that can be configured to the terminal for partial BFR operation, the maximum number of BFD RSs, the maximum number of BFD RSs per BFD RS set, the number of TRPs connected to the BFD RS in each BFD RS set, the number of candidate beam sets, the number of TRPs connected to a candidate beam in the candidate beam set, and maximum number of candidate beams per candidate beam set.

With reference to the capability report of the terminal, the base station may configure, through higher layer signaling, the terminal with the number of BFD RS sets, the maximum number of BFD RSs, the maximum number of BFD RSs per BFD RS set, the number of TRPs connected to a BFD RS in each BFD RS set, the number of candidate beam sets, and the maximum number of candidate beams per candidate beam set. In addition, the maximum number of BFD RSs or the number of candidate beams may be included in the number of SSBs, CSI-RSs, or CSI-IMs that the terminal can use in all subcarriers.

Figure 15:
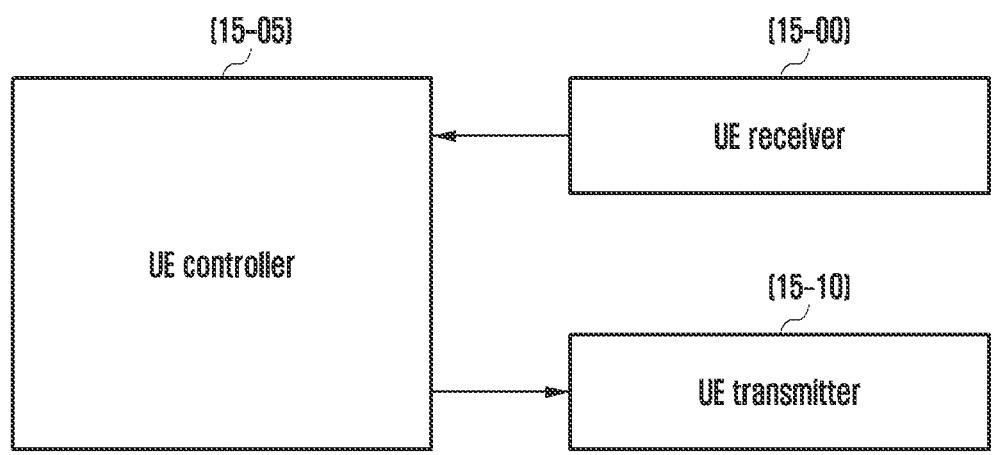
FIG. 15 is a block diagram illustrating the structure of a terminal according to an embodiment of the disclosure.

FIG. 15 is a block diagram illustrating the structure of a terminal according to an embodiment of the disclosure.

With reference to FIG. 15, the terminal may include a transceiver including a receiver 15-00 and a transmitter 15-10, and a controller 15-05 including a memory and a processor. The transceiver (15-00, 15-10) and the controller 15-05 of the terminal may operate according to the communication method of the terminal described above. However, the components of the terminal are not limited to the above-described example. For example, the terminal may include more or fewer components than the aforementioned components. In addition, the transceiver (15-00, 15-10) and the controller 15-05 may be implemented in the form of a single chip.

The transceiver (15-00, 15-10) may transmit and receive a signal to and from a base station. Here, the signal may include control information and data. To this end, the transceiver (15-00, 15-10) may be composed of an RF transmitter that up-converts and amplifies the frequency of a signal to be transmitted, and an RF receiver that low-noise amplifies a received signal and down-converts the frequency. However, this is only an embodiment of the transceiver (15-00, 15-10), and components of the transceiver (15-00, 15-10) are not limited to the RF transmitter and the RF receiver.

In addition, the transceiver (15-00, 15-10) may receive a signal through a radio channel and output it to the controller 15-05, and may transmit a signal from the controller 15-05 through a radio channel.

The controller 15-05 may store programs and data necessary for the operation of the terminal, and may be implemented with one or more processors. Also, the controller 15-05 may store control information or data included in a signal obtained by the terminal. The controller 15-05 may include a memory composed of a storage medium such as ROM, RAM, hard disk, CD-ROM, or DVD, or a combination of storage media.

Further, the controller 15-05 may control a series of processes so that the terminal can operate according to the above-described embodiments. According to some embodiments, the controller 15-05 may receive a DCI composed of two layers, and control components of the terminal to simultaneously receive a plurality of PDSCHs.

Figure 16:
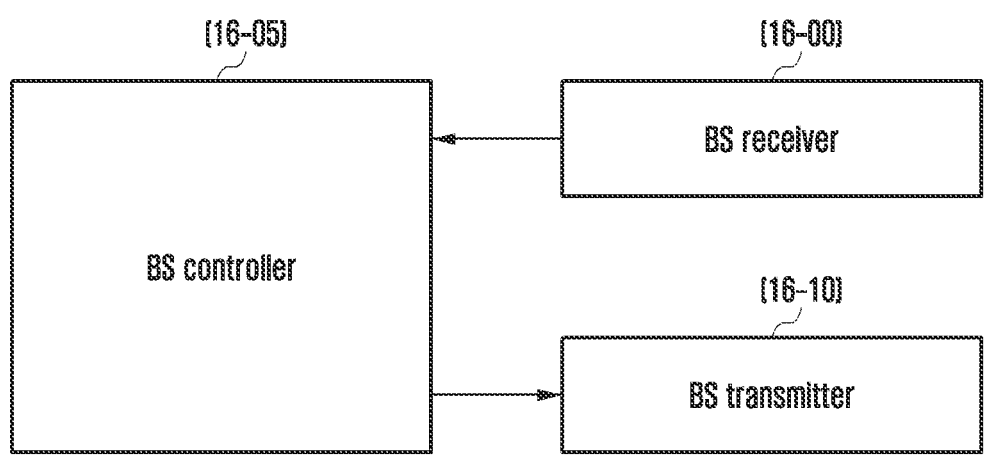
FIG. 16 is a block diagram illustrating the structure of a base station according to an embodiment of the disclosure.

FIG. 16 is a block diagram illustrating the structure of a base station according to an embodiment of the disclosure.

With reference to FIG. 16, the base station may include a transceiver including a receiver 16-00 and a transmitter 16-10, and a controller 16-05 including a memory and a processor. The transceiver (16-00, 16-10) and the controller 16-05 of the base station may operate according to the communication method of the base station described above. However, the components of the base station are not limited to the above-described example. For example, the base station may include more or fewer components than the aforementioned components. In addition, the transceiver (16-00, 16-10) and the controller 16-05 may be implemented in the form of a single chip.

The transceiver (16-00, 16-10) may transmit and receive a signal to and from a terminal. Here, the signal may include control information and data. To this end, the transceiver (16-00, 16-10) may be composed of an RF transmitter that up-converts and amplifies the frequency of a signal to be transmitted, and an RF receiver that low-noise amplifies a received signal and down-converts the frequency. However, this is only an embodiment of the transceiver (16-00, 16-10), and components of the transceiver (16-00, 16-10) are not limited to the RF transmitter and the RF receiver.

In addition, the transceiver (16-00, 16-10) may receive a signal through a radio channel and output it to the controller 16-05, and may transmit a signal from the controller 16-05 through a radio channel.

The controller 16-05 may store programs and data necessary for the operation of the base station, and may be implemented with one or more processors. Also, the controller 16-05 may store control information or data included in a signal obtained by the base station. The controller 16-05 may include a memory composed of a storage medium such as ROM, RAM, hard disk, CD-ROM, or DVD, or a combination of storage media.

Further, the controller 16-05 may control a series of processes so that the base station can operate according to the above-described embodiments. According to some embodiments, the controller 16-05 may control individual components of the base station to compose a DCI including PDSCH allocation information and transmit it.

On the other hand, the embodiments of the disclosure disclosed in the present specification and drawings are only presented as specific examples to easily explain the technical contents of the disclosure and help the understanding of the disclosure, and are not intended to limit the scope of the disclosure. That is, it will be apparent to those of ordinary skill in the art to which the disclosure pertains that other modifications may be carried out based on the technical spirit of the disclosure. In addition, the above embodiments may be operated in combination with each other as needed. For example, parts of Embodiments 1 to 6 of the disclosure may be combined with each other to operate a base station and a terminal.

In the above embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

On the other hand, although specific embodiments have been described in the detailed description of the disclosure, various modifications are possible without departing from the scope of the disclosure. Therefore, the scope of the disclosure should not be limited to the described embodiments and should be defined by both the claims described below and their equivalents.

The invention claimed is:

1. A method performed by a user equipment (UE) in a communication system, the method comprising:
transmitting UE capability information indicating that the UE supports beam failure recovery (BFR) for multi-transmission and reception point (M-TRP) based on two beam failure detection (BFD)-reference signal (BFD-RS) sets, wherein the UE capability information includes (i) a first maximum number of BFD-RSs supported for the BFR per each of the two BFD-RS sets and (ii) a second maximum number of BFD-RSs supported for the BFR;
identifying the two BFD-RS sets, including a first BFD-RS set and a second BFD-RS set, wherein:
a number of BFD RSs included in the first BFD RS set and a number of BFD RSs included in the second BFD RS set are respectively associated with the first maximum number, and
the number of BFD RSs included in the first BFD RS set and the number of BFD RSs included in the second BFD RS set are associated with the second maximum number; and
transmitting at least one of:
first beam failure recovery request information associated with the first BFD-RS set, or
second beam failure recovery request information associated with the second BFD-RS set.

2. The method of claim 1, further comprising:
receiving, via higher layer signaling, a first candidate beam RS list corresponding to the first BFD RS set, and a second candidate beam RS list corresponding to the second BFD RS set;
receiving, on a physical downlink control channel (PDCCH), downlink control information (DCI) scheduling a first physical uplink shared channel (PUSCH); and
transmitting, on a second PUSCH, at least one of information on a first candidate beam RS included in the first candidate beam RS list or information on a second candidate beam RS included in the second candidate beam RS list,
wherein the DCI includes a hybrid automatic repeat request (HARQ) process number being same as a HARQ process number in DCI scheduling the second PUSCH,
wherein in case that the first candidate beam RS is transmitted, the first candidate beam RS is used as a quasi co-location (QCL) RS for a first control resource set (CORESET) corresponding to a CORESET pool index value being 0 after 28 symbols from a last symbol of the PDCCH, and
wherein in case that the second candidate beam RS is transmitted, the second candidate beam RS is used as a QCL RS for a second CORESET corresponding to the CORESET pool index value being 1 after 28 symbols from the last symbol of the PDCCH.

3. The method of claim 1, wherein in case that information on the first BFD RS set and information on the second BFD RS set is not received, the first BFD RS set is identified to include an RS of a transmission configuration indication (TCI) state for a first CORESET corresponding to a CORESET pool index value being 0 and the second BFD RS set is identified to include an RS of a TCI state for a second CORESET corresponding to the CORESET pool index value being 1.

4. The method of claim 1, wherein information on the first BFD RS set and information on the second BFD RS set is received via higher layer signaling.

5. The method of claim 1,
wherein the first beam failure recovery request information is transmitted in case that a first BFR associated with the first BFD RS set is triggered based on a first counter for first beam failure instance indication associated with the first BFD RS set, a first timer for beam failure detection associated with the first BFD RS set, and a first maximum count for the first beam failure instance, and
wherein the second beam failure recovery request information is transmitted in case that a second BFR associated with the second BFD RS set is triggered based on a second counter for second beam failure instance indication associated with the second BFD RS set, a second timer for beam failure detection associated with the second BFD RS set, and a second maximum count for the second beam failure instance.

6. The method of claim 5,
wherein in case that first beam failure instance indication has been detected, the first counter is increased by 1,
wherein in case that the first counter is equal to or greater than the first maximum count, the first BFR is triggered,
wherein in case that the first timer expires, the first counter is set to 0,
wherein in case that second beam failure instance indication has been detected, the second counter is increased by 1,
wherein in case that the second counter is equal to or greater than the second maximum count, the second BFR is triggered, and
wherein in case that the second timer expires, the second counter is set to 0.

7. The method of claim 1,
wherein the first beam failure recovery request information is transmitted via a first physical uplink control channel (PUCCH) associated with the first BFD-RS set, and
wherein the second beam failure recovery request information is transmitted via a second PUCCH associated with the second BFD-RS set.

8. A method performed by a base station in a communication system, the method comprising:
receiving, from a user equipment (UE), UE capability information indicating that the UE supports beam failure recovery (BFR) for multi-transmission and reception point (M-TRP) based on two beam failure detection (BFD)-reference signal (BFD-RS) sets, wherein the UE capability information includes (i) a first maximum number of BFD-RSs supported by the UE for the BFR per each of the two BFD-RS sets and (ii) a second maximum number of BFD-RSs supported by the UE for the BFR;

transmitting, to the UE, information associated with the two BFD-RS sets including a first BFD-RS set and a second BFD-RS set, wherein:
- a number of BFD RSs included in the first BFD RS set and a number of BFD RSs included in the second BFD RS set are respectively associated with the first maximum number, and
- the number of BFD RSs included in the first BFD RS set and the number of BFD RSs included in the second BFD RS set are associated with the second maximum number; and receiving at least one of:
- first beam failure recovery request information associated with the first BFD-RS set, or
- second beam failure recovery request information associated with the second BFD-RS set.

9. The method of claim 8, further comprising:
transmitting, to the UE via higher layer signaling, a first candidate beam RS list corresponding to the first BFD RS set, and a second candidate beam RS list corresponding to the second BFD RS set;
transmitting, to the UE on a physical downlink control channel (PDCCH), downlink control information (DCI) scheduling a first physical uplink shared channel (PUSCH); and
receiving, from the UE on a second PUSCH, at least one of information on a first candidate beam RS in the first candidate beam RS list or information on a second candidate beam RS in the second candidate beam RS list,
wherein the DCI includes a hybrid automatic repeat request (HARQ) process number being same as a HARQ process number in DCI scheduling the second PUSCH,
wherein in case that the first candidate beam RS is received, the first candidate beam RS is used as a quasi co-location (QCL) RS for a first control resource set (CORESET) corresponding to a CORESET pool index value being 0 after 28 symbols from a last symbol of the PDCCH, and
wherein in case that the second candidate beam RS is received, the second candidate beam RS is used as a QCL RS for a second CORESET corresponding to the CORESET pool index value being 1 after 28 symbols from the last symbol of the PDCCH.

10. The method of claim 8, wherein in case that information on the first BFD RS set and information on the second BFD RS set is not transmitted, the first BFD RS set is identified to include an RS of a transmission configuration indication (TCI) state for a first CORESET corresponding to a CORESET pool index value being 0 and the second BFD RS set is identified to include an RS of a TCI state for a second CORESET corresponding to the CORESET pool index value being 1.

11. The method of claim 8, wherein information on the first BFD RS set and information on the second BFD RS set is transmitted via higher layer signaling.

12. The method of claim 8,
wherein the first beam failure recovery request information is received in case that a first BFR associated with the first BFD RS set is triggered based on a first counter for first beam failure instance indication associated with the first BFD RS set, a first timer for beam failure detection associated with the first BFD RS set, and a first maximum count for the first beam failure instance, and wherein the second beam failure recovery request information is received in case that a second BFR associated with the second BFD RS set is triggered based on a second counter for second beam failure instance indication associated with the second BFD RS set, a second timer for beam failure detection associated with the second BFD RS set, and a second maximum count for the second beam failure instance.

13. The method of claim 12,
wherein in case that first beam failure instance indication has been detected, the first counter is increased by 1,
wherein in case that the first counter is equal to or greater than the first maximum count, the first BFR is triggered,
wherein in case that the first timer expires, the first counter is set to 0,
wherein in case that second beam failure instance indication has been detected, the second counter is increased by 1,
wherein in case that the second counter is equal to or greater than the second maximum count, the second BFR is triggered, and
wherein in case that the second timer expires, the second counter is set to 0.

14. A user equipment (UE) in a communication system, the UE comprising:
a transceiver; and
a processor coupled with the transceiver and configured to:
- transmit UE capability information indicating that the UE supports beam failure recovery (BFR) for multi-transmission and reception point (M-TRP) based on two beam failure detection (BFD)-reference signal (BFD-RS) sets, wherein the UE capability information includes (i) a first maximum number of BFD-RSs supported for the BFR per each of the two BFD-RS sets and (ii) a second maximum number of BFD-RSS supported for the BFR,
- identify the two BFD-RS sets, including a first BFD-RS set and a second BFD-RS set, wherein:
  - a number of BFD RSs included in the first BFD RS set and a number of BFD RSs included in the second BFD RS set are respectively associated with the first maximum number, and
  - the number of BFD RSs included in the first BFD RS set and the number of BFD RSs included in the second BFD RS set are associated with the second maximum number, and
- transmit at least one of:
  - first beam failure recovery request information associated with the first BFD-RS set, or
  - second beam failure recovery request information associated with the second BFD-RS set.

15. The UE of claim 14,
wherein the processor is further configured to:
- receive, via higher layer signaling, a first candidate beam RS list corresponding to the first BFD RS set, and a second candidate beam RS list corresponding to the second BFD RS set,
- receive, on a physical downlink control channel (PDCCH), downlink control information (DCI) scheduling a first physical uplink shared channel (PUSCH), and
- transmit, on a second PUSCH, at least one of information on a first candidate beam RS included in the first candidate beam RS list or information on a second candidate beam RS included in the second candidate beam RS list, wherein the DCI includes a hybrid automatic repeat request (HARQ) process number being same as a HARQ process number in DCI scheduling the second PUSCH, wherein in case that the first candidate beam RS is transmitted, the first candidate beam RS is used as a quasi co-location (QCL) RS for a first control resource set (CORESET) corresponding to a CORESET pool index value being 0 after 28 symbols from a last symbol of the PDCCH, and wherein in case that the second candidate beam RS is transmitted, the second candidate beam RS is used as a QCL RS for a second CORESET corresponding to the CORESET pool index value being 1 after 28 symbols from the last symbol of the PDCCH.

16. The UE of claim 14, wherein in case that information on the first BFD RS set and information on the second BFD RS set is not received, the first BFD RS set is identified to include an RS of a transmission configuration indication (TCI) state for a first CORESET corresponding to a CORESET pool index value being 0 and the second BFD RS set is identified to include an RS of a TCI state for a second CORESET corresponding to the CORESET pool index value being 1.

17. The UE of claim 14, wherein information on the first BFD RS set and information on the second BFD RS set is received via higher layer signaling.

18. The UE of claim 14, wherein the first beam failure recovery request information is transmitted in case that a first BFR associated with the first BFD RS set is triggered based on a first counter for first beam failure instance indication associated with the first BFD RS set, a first timer for beam failure detection associated with the first BFD RS set, and a first maximum count for the first beam failure instance, and wherein the second beam failure recovery request information is transmitted in case that a second BFR associated with the second BFD RS set is triggered based on a second counter for second beam failure instance indication associated with the second BFD RS set, a second timer for beam failure detection associated with the second BFD RS set, and a second maximum count for the second beam failure instance.

19. The UE of claim 18, wherein in case that first beam failure instance indication has been detected, the first counter is increased by 1, wherein in case that the first counter is equal to or greater than the first maximum count, the first BFR is triggered, wherein in case that the first timer expires, the first counter is set to 0, wherein in case that second beam failure instance indication has been detected, the second counter is increased by 1, wherein in case that the second counter is equal to or greater than the second maximum count, the second BFR is triggered, and wherein in case that the second timer expires, the second counter is set to 0.

20. A base station in a communication system, the base station comprising:

a transceiver; and a processor coupled with the transceiver and configured to:

receive, from a user equipment (UE), UE capability information indicating that the UE supports beam failure recovery (BFR) for multi-transmission and reception point (M-TRP) based on two beam failure detection (BFD)-reference signal (BFD-RS) sets, wherein the UE capability information includes (i) a first maximum number of BFD-RSs supported by the UE for the BFR per each of the two BFD-RS sets and (ii) a second maximum number of BFD-RSs supported by the UE for the BFR, transmit, to the UE, information associated with two BFD-RS sets including a first BFD-RS set and a second BFD-RS set, wherein:

the two BFD-RS sets are associated with the BFR for the M-TRP, a number of BFD RSs included in the first BFD RS set and a number of BFD RSs included in the second BFD RS set are respectively associated with the first maximum number, and the number of BFD RSs included in the first BFD RS set and the number of BFD RSs included in the second BFD RS set are associated with the second maximum number, and receive at least one of:

first beam failure recovery request information associated with the first BFD-RS set, or second beam failure recovery request information associated with the second BFD-RS set.

21. The base station of claim 20, wherein the processor is further configured to:

transmit, to the UE via higher layer signaling, a first candidate beam RS list corresponding to the first BFD RS set, and a second candidate beam RS list corresponding to the second BFD RS set, transmit, to the UE on a physical downlink control channel (PDCCH), downlink control information (DCI) scheduling a first physical uplink shared channel (PUSCH), and receive, from the UE on a second PUSCH, at least one of information on a first candidate beam RS in the first candidate beam RS list or information on a second candidate beam RS in the second candidate beam RS list, wherein the DCI includes a hybrid automatic repeat request (HARQ) process number being same as a HARQ process number in DCI scheduling the second PUSCH, wherein in case that the first candidate beam RS is received, the first candidate beam RS is used as a quasi co-location (QCL) RS for a first control resource set (CORESET) corresponding to a CORESET pool index value being 0 after 28 symbols from a last symbol of the PDCCH, and wherein in case that the second candidate beam RS is received, the second candidate beam RS is used as a QCL RS for a second CORESET corresponding to the CORESET pool index value being 1 after 28 symbols from the last symbol of the PDCCH.

22. The base station of claim 20, wherein in case that information on the first BFD RS set and information on the second BFD RS set is not transmitted, the first BFD RS set is identified to include an RS of a transmission configuration indication (TCI) state for a first CORESET corresponding to a CORESET pool index value being 0 and the second BFD RS set is identified to include an RS of a TCI state for a second CORESET corresponding to the CORESET pool index value being 1.

23. The base station of claim 20, wherein information on the first BFD RS set and information on the second BFD RS set is transmitted via higher layer signaling.

24. The base station of claim 20,
wherein the first beam failure recovery request information is received in case that a first BFR associated with the first BFD RS set is triggered based on a first counter for first beam failure instance indication associated with the first BFD RS set, a first timer for beam failure detection associated with the first BFD RS set, and a first maximum count for the first beam failure instance, and
wherein the second beam failure recovery request information is received in case that a second BFR associated with the second BFD RS set is triggered based on a second counter for second beam failure instance indication associated with the second BFD RS set, a second timer for beam failure detection associated with the second BFD RS set, and a second maximum count for the second beam failure instance.

25. The base station of claim 24,
wherein in case that first beam failure instance indication has been detected, the first counter is increased by 1,
wherein in case that the first counter is equal to or greater than the first maximum count, the first BFR is triggered,
wherein in case that the first timer expires, the first counter is set to 0,
wherein in case that second beam failure instance indication has been detected, the second counter is increased by 1,
wherein in case that the second counter is equal to or greater than the second maximum count, the second BFR is triggered, and
wherein in case that the second timer expires, the second counter is set to 0.

* * * * *